(12) United States Patent
Breed et al.

(10) Patent No.: US 6,393,133 B1
(45) Date of Patent: *May 21, 2002

(54) METHOD AND SYSTEM FOR CONTROLLING A VEHICULAR SYSTEM BASED ON OCCUPANCY OF THE VEHICLE

(75) Inventors: David S. Breed, Boonton Township, Morris County, NJ (US); Wilbur E. Duvall, Kimberling City, MO (US); Wendell C. Johnson, San Diego, CA (US)

(73) Assignee: Automotive Technologies International, Inc., Denville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/389,947

(22) Filed: Sep. 3, 1999

Related U.S. Application Data

(63) Continuation-in-part of application No. 09/200,614, filed on Nov. 30, 1998, now Pat. No. 6,141,432, which is a continuation of application No. 08/474,786, filed on Jun. 7, 1995, now Pat. No. 5,845,000, which is a continuation-in-part of application No. 07/878,571, filed on May 5, 1992, now abandoned, and a continuation-in-part of application No. 08/040,978, filed on Mar. 31, 1993, now abandoned, and a continuation-in-part of application No. 08/247,760, filed on May 23, 1994, now abandoned, and a continuation-in-part of application No. 08/239,978, filed on May 9, 1994, now abandoned.

(51) Int. Cl.[7] ............................................... G06K 9/00
(52) U.S. Cl. ..................... 382/100; 348/135; 280/735
(58) Field of Search ................................ 382/100, 104, 382/103, 291; 340/436; 348/143, 148, 135, 139, 118; 280/735

(56) References Cited

U.S. PATENT DOCUMENTS 3,705,261 A * 12/1972 Langley ......................... 17/6.5
4,496,222 A     1/1985 Shah ........................... 3592/300
4,625,329 A    11/1986 Ishikawa et al. ............. 382/104

(List continued on next page.)

FOREIGN PATENT DOCUMENTS

| GB | 2289332 | 11/1995 |
| JP | 342337 | 2/1991 |
| WO | 94/22693 | 10/1994 |

OTHER PUBLICATIONS

M. Naka et al "Thermal Image Processing Using Neural Network", Proceedings of 1993 International Joint Conference on Neural Network, 1993, pps 2065–2068.*

(List continued on next page.)

Primary Examiner—Yon J. Couso
(74) Attorney, Agent, or Firm—Brian Roffe

(57) ABSTRACT

A vehicle interior monitoring system to identify, locate and/or monitor occupants, including their parts, and other objects in the passenger compartment in which waves are transmitted into a space in the passenger compartment in which an occupying item might be situated and a receiver receives waves modified by passing through the space in the passenger compartment in which the occupying item might be situated. Outputs from the receiver are used to affect another system in the vehicle. Also, the outputs may be analyzed, e.g., by computational means employing pattern recognition technologies, to classify, identify and/or locate the contents. In general, the information obtained by the identification and monitoring system is used to affect the operation of some other system in the vehicle. When the system is installed in the passenger compartment of an automotive vehicle equipped with an airbag, the system determines the position of the vehicle occupant relative to the airbag and, e.g., disables deployment of the airbag if the occupant is positioned so that he/she is likely to be injured by the deployment of the airbag.

39 Claims, 12 Drawing Sheets

U.S. PATENT DOCUMENTS

| | | | | |
|---|---|---|---|---|
| 4,648,052 | A | 3/1987 | Friedman et al. | 364/550 |
| 4,720,189 | A | 1/1988 | Heynen et al. | 351/210 |
| 4,768,088 | A | 8/1988 | Ando | 358/93 |
| 4,836,670 | A | 6/1989 | Hutchinson | 351/210 |
| 4,881,270 | A | 11/1989 | Knecht et al. | 382/191 |
| 4,906,940 | A | 3/1990 | Greene et al. | 382/100 |
| 4,950,069 | A | 8/1990 | Hutchinson | 351/210 |
| 4,966,388 | A | 10/1990 | Warner et al. | 280/730 |
| 5,003,166 | A | 3/1991 | Girod | 250/201.4 |
| 5,008,946 | A | 4/1991 | Ando | 382/104 |
| 5,026,153 | A | 6/1991 | Suzuki et al. | 356/1 |
| 5,060,278 | A | 10/1991 | Fukumizu | 382/157 |
| 5,064,274 | A | 11/1991 | Alten | 359/604 |
| 5,071,160 | A | 12/1991 | White et al. | 280/735 |
| 5,074,583 | A | 12/1991 | Fujita et al. | 280/730.1 |
| 5,118,134 | A | 6/1992 | Mattes et al. | 280/735 |
| 5,162,861 | A | 11/1992 | Tamburino et al. | 356/5.05 |
| 5,181,254 | A | 1/1993 | Schweizer et al. | 382/100 |
| 5,185,667 | A | 2/1993 | Zimmermann | 348/143 |
| 5,193,124 | A | 3/1993 | Subbarao | 382/255 |
| 5,214,744 | A | 5/1993 | Schweizer et al. | 395/11 |
| 5,227,784 | A | 7/1993 | Masamori et al. | 340/903 |
| 5,235,339 | A | 8/1993 | Morrison et al. | 342/159 |
| 5,249,027 | A | 9/1993 | Mathur et al. | 356/3.14 |
| 5,249,157 | A | 9/1993 | Taylor | 340/903 |
| 5,298,732 | A | 3/1994 | Chen | 250/203.4 |
| 5,305,012 | A | 4/1994 | Faris | 345/7 |
| 5,309,137 | A | 5/1994 | Kajiwara | 340/436 |
| 5,329,206 | A | 7/1994 | Slotkowski et al. | 315/159 |
| 5,330,226 | A | 7/1994 | Gentry et al. | 280/735 |
| 5,339,075 | A | 8/1994 | Abst et al. | 340/903 |
| 5,355,118 | A | 10/1994 | Fukuhara | 340/435 |
| 5,377,108 | A * | 12/1994 | Nishio | 36/424.05 |
| 5,390,136 | A | 2/1995 | Wang | 364/754 |
| 5,441,052 | A | 8/1995 | Miyajima | 128/661.09 |
| 5,446,661 | A | 8/1995 | Gioutsos et al. | 364/424.05 |
| 5,454,591 | A | 10/1995 | Mazur et al. | 280/735 |
| 5,482,314 | A | 1/1996 | Corrado et al. | 280/735 |
| 5,528,698 | A | 6/1996 | Kamei et al. | 382/100 |
| 5,537,003 | A | 7/1996 | Bechtel et al. | 315/82 |
| 5,563,650 | A | 10/1996 | Poelstra | 348/36 |
| 6,226,389 | B1 * | 5/2001 | Lemelson et al. | 382/104 |

OTHER PUBLICATIONS

I.T. Muirhead "Developments in CMOS Camera Technology", Intergrated Imaging Sensors and Processing, IEE Colloquium, 1994, 5/1–5/4.*

U. Seger et al "Vision Assistance in Scenes with Extreme Contrst", IEEE Micro, Feb. 1993, pps. 50–56.*

Derwent Abstract of German Patent Publication No. DE 42 11 556, Oct. 7, 1993.

Derwent Abstract of Japanese Patent Application No. 02–051332, Nov. 13, 1991.

* cited by examiner

METHOD AND SYSTEM FOR CONTROLLING A VEHICULAR SYSTEM BASED ON OCCUPANCY OF THE VEHICLE

CROSS REFERENCE TO RELATED APPLICATIONS

This application is a continuation-in-part of U.S. patent application Ser. No. 09/200,614 filed Nov. 30, 1998 now U.S. Pat. No. 6,141,432 which in turn is a continuation of U.S. patent application Ser. No. 08/474,786 filed Jun. 7, 1995 (now U.S. Pat. No. 5,845,000), which in turn is a continuation-in-part of U.S. patent application Ser. No. 07/878,571 filed May 5, 1992, now abandoned, of patent application Ser. No. 08/040,978 filed Mar. 31, 1993, now abandoned , of U.S. patent application Ser. No. 08/247,760 filed May 23, 1994, now abandoned and of U.S. patent application Ser. No. 08/239,978 filed May 9, 1994, now abandoned, the last three of which are included herein by reference.

BACKGROUND OF THE INVENTION

1. Prior Art on Out of Position Occupants and Rear Facing Child Seats

Whereas thousands of lives have been saved by airbags, a large number of people have also been injured, some seriously, by the deploying airbag, and thus significant improvements need to be made in this regard. As discussed in detail in copending patent applications 08/040,978 and 08/239,978 cross-referenced above, for a variety of reasons vehicle occupants may be too close to the airbag before it deploys and can be seriously injured or killed as a result of the deployment thereof. Also, a child in a rear facing child seat that is placed on the right front passenger seat is in danger of being seriously injured if the passenger airbag deploys. For these reasons and, as first publicly disclosed in Breed, D. S. "How Airbags Work" presented at the International Conference on Seatbelts and Airbags in 1993, in Canada, occupant position sensing and rear facing child seat detection is required.

Initially these systems will solve the out-of-position occupant and the rear facing child seat problems related to current airbag systems and prevent unneeded airbag deployments when a front seat is unoccupied. However, airbags are now under development to protect rear seat occupants in vehicle crashes and all occupants in side impacts. A system will therefore be needed to detect the presence of occupants, determine if they are out-of-position and to identify the presence of a rear facing child seat in the rear seat. Future automobiles are expected to have eight or more airbags as protection is sought for rear seat occupants and from side impacts. In addition to eliminating the disturbance and possible harm of unnecessary airbag deployments, the cost of replacing these airbags will be excessive if they all deploy in an accident needlessly.

Inflators now exist which will adjust the amount of gas flowing to the airbag to account for the size and position of the occupant and for the severity of the accident. The vehicle identification and monitoring system (VIMS) discussed in patent application Ser. No. 08/239,978 will control such inflators based on the presence and position of vehicle occupants or of a rear facing child seat. The instant invention is an improvement on that VIMS system and uses an advanced optical system comprising one or more CCD (charge coupled device) arrays and a source of illumination combined with a trained neural network pattern recognition system.

The need for an occupant out-of-position sensor has been observed by others and several methods have been disclosed in U.S. patents for determining the position of an occupant of a motor vehicle. Each of these systems, however, has significant limitations. In White et al. (U.S. Pat. No. 5,071, 160), for example, a single acoustic sensor and detector is disclosed and, as illustrated, is mounted lower than the steering wheel. White et al. correctly perceive that such a sensor could be defeated, and the airbag falsely deployed, by an occupant adjusting the control knobs on the radio and thus they suggest the use of a plurality of such sensors.

Mattes et al. (U.S. Pat. No. 5,118,134) disclose a variety of methods of measuring the change in position of an occupant including ultrasonic, active or passive infrared and microwave radar sensors, and an electric eye. Their use of these sensors is to measure the change in position of an occupant during a crash and use that information to access the severity of the crash and thereby decide whether or not to deploy the airbag. They are thus using the occupant motion as a crash sensor. No mention is made of determining the out-of-position status of the occupant or of any of the other features of occupant monitoring as disclosed in the above cross-referenced patent applications. It is interesting to note that nowhere does Mattes et al. discuss how to use active or passive infrared to determine the position of the occupant. As pointed out in the above cross-referenced patent applications, direct occupant position measurement based on passive infrared is probably not possible and, until very recently, was very difficult and expensive with active infrared requiring the modulation of an expensive GaAs infrared laser. Since there is no mention of these problems, the method of use contemplated by Mattes et al. must be similar to the electric eye concept where position is measured indirectly as the occupant passes by a plurality of longitudinally spaced-apart sensors.

The object of an occupant out-of-position sensor is to determine the location of the head and/or chest of the vehicle occupant relative to the airbag since it is the impact of either the head or chest with the deploying airbag which can result in serious injuries. Both White et al. and Mattes et al. disclose only lower mounting locations of their sensors that are mounted in front of the occupant such as on the dashboard or below the steering wheel. Both such mounting locations are particularly prone to detection errors due to positioning of the occupant's hands, arms and legs. This would require at least three, and preferably more, such sensors and detectors and an appropriate logic circuitry which ignores readings from some sensors if such readings are inconsistent with others, for the case, for example, where the driver's arms are the closest objects to two of the sensors.

White et al. also disclose the use of error correction circuitry, without defining or illustrating the circuitry, to differentiate between the velocity of one of the occupant's hands as in the case where he/she is adjusting the knob on the radio and the remainder of the occupant. Three ultrasonic sensors of the type disclosed by White et al. might, in some cases, accomplish this differentiation if two of them indicated that the occupant was not moving while the third was indicating that he or she was. Such a combination, however, would not differentiate between an occupant with both hands and arms in the path of the ultrasonic transmitter at such a location that they were blocking a substantial view of the occupant's head or chest. Since the sizes and driving positions of occupants are extremely varied, trained pattern recognition systems, such as neural networks, are required when a clear view of the occupant, unimpeded by his/her extremities, cannot be guaranteed.

Fujita et al., in U.S. Pat. No. 5,074,583, illustrates another method of determining the position of the occupant but do not use this information to suppress deployment if the occupant is out-of-position. In fact, the closer that the occupant gets to the airbag the faster the inflation rate of the airbag is according to the Fujita patent, which thereby increases the possibility of injuring the occupant. Fujita et al. do not measure the occupant directly but instead determine his or her position indirectly from measurements of the seat position and the vertical size of the occupant relative to the seat. This occupant height is determined using an ultrasonic displacement sensor mounted directly above the occupant's head.

As discussed above, the optical systems described herein are also applicable for many other sensing applications both inside and outside of the vehicle compartment such as for sensing crashes before they occur as described in copending patent application Ser. No. 08/239,978 cross-referenced above, for a smart headlight adjustment system and for a blind spot monitor.

2. Definitions

The use of pattern recognition is central to the instant invention as well as those cross-referenced patent applications above. Nowhere in the prior art is pattern recognition that is based on training, as exemplified through the use of neural networks, mentioned for use in monitoring the interior or exterior environments of the vehicle. "Pattern recognition" as used herein will mean any system which processes a signal that is generated by an object, or is modified by interacting with an object, in order to determine which one of a set of classes that the object belongs to. Such a system might determine only that the object is or is not a member of one specified class, or it might attempt to assign the object to one of a larger set of specified classes, or find that it is not a member of any of the classes in the set. The signals processed are generally electrical signals coming from transducers which are sensitive to either acoustic or electromagnetic radiation and, if electromagnetic, they can be either visible light, infrared, ultraviolet or radar. A trainable or a trained pattern recognition system as used herein means a pattern recognition system which is taught various patterns by subjecting the system to a variety of examples. The most successful such system is the neural network.

To "identify" as used herein will mean to determine that the object belongs to a particular set or class. The class may be one containing, for example, all rear facing child seats, one containing all human occupants, or all human occupants not sitting in a rear facing child seat depending on the purpose of the system. In the case where a particular person is to be recognized, the set or class will contain only a single element, i.e., the person to be recognized.

An "occupying item" of a seat may be a living occupant such as a human being or a dog, another living organism such as a plant, or an inanimate object such as a box or bag of groceries.

In the description herein on anticipatory sensing, the term "approaching" when used in connection with the mention of an object or vehicle approaching another will mean the relative motion of the object toward the vehicle having the anticipatory sensor system. Thus, in a side impact with a tree, the tree will be considered as approaching the side of the vehicle and impacting the vehicle. In other words, the coordinate system used in general will be a coordinate system residing in the target vehicle. The "target" vehicle is the vehicle that is being impacted. This convention permits a general description to cover all of the cases such as where (i) a moving vehicle impacts into the side of a stationary vehicle, (ii) where both vehicles are moving when they impact, or (iii) where a vehicle is moving sideways into a stationary vehicle, tree or wall.

3. Pattern Recognition Prior Art

Japanese patent 3-42337 (A) to Ueno discloses a device for detecting the driving condition of a vehicle driver comprising a light emitter for irradiating the face of the driver and a means for picking up the image of the driver and storing it for later analysis. Means are provided for locating the eyes of the driver and then the irises of the eyes and then determining if the driver is looking to the side or sleeping. Ueno determines the state of the eyes of the occupant rather than determining the location of the eyes relative to the other parts of the vehicle passenger compartment. Such a system can be defeated if the driver is wearing glasses, particularly sunglasses, or another optical device which obstructs a clear view of his/her eyes. Pattern recognition technologies such as neural networks are not used.

U.S. Pat. No. 5,008,946 to Ando uses a complicated set of rules to isolate the eyes and mouth of a driver and uses this information to permit the driver to control the radio, for example, or other systems within the vehicle by moving his eyes and/or mouth. Ando uses natural light and illuminates only the head of the driver. He also makes no use of trainable pattern recognition systems such as neural networks, nor is there any attempt to identify the contents of the vehicle nor of their location relative to the vehicle passenger compartment. Rather, Ando is limited to control of vehicle devices by responding to motion of the driver's mouth and eyes.

U.S. Pat. No. 5,298,732 to Chen also concentrates in locating the eyes of the driver so as to position a light filter between a light source such as the sun or the lights of an oncoming vehicle, and the driver's eyes. Chen does not explain in detail how the eyes are located but does supply a calibration system whereby the driver can adjust the filter so that it is at the proper position relative to his or her eyes. Chen references the use of automatic equipment for determining the location of the eyes but does not describe how this equipment works. In any event, there is no mention of monitoring the position of the occupant, other that the eyes, of determining the position of the eyes relative to the passenger compartment, or of identifying any other object in the vehicle other than the driver's eyes. Also, there is no mention of the use of a trainable pattern recognition system.

U.S. Pat. No. 5,305,012 to Faris also describes a system for reducing the glare from the headlights of an oncoming vehicle. Faris locates the eyes of the occupant by the use of two spaced apart infrared cameras using passive infrared radiation from the eyes of the driver. Again, Faris is only interested in locating the driver's eyes relative to the sun or oncoming headlights and does not identify or monitor the occupant or locate the occupant relative to the passenger compartment or the airbag. Also, Faris does not use trainable pattern recognition techniques such as neural networks. Faris, in fact, does not even say how the eyes of the occupant are located but refers the reader to a book entitled Robot Vision (1991) by Berthold Horn, published by MIT Press, Cambridge, Mass. Also, Faris uses the passive infrared radiation rather than illuminating the occupant with active infrared radiation or in general electromagnetic radiation as in the instant invention.

The use of neural networks as the pattern recognition technology is central to this invention since it makes the monitoring system robust, reliable and practical. The resulting algorithm created by the neural network program is usually only a few lines of code written in the C computer language as opposed to typically hundreds of lines when the techniques of the above patents to Ando, Chen and Faris are implemented. As a result, the resulting systems are easy to implement at a low cost making them practical for automotive applications. The cost of the CCD arrays, for example, have been prohibitively expensive until very recently rendering their use for VIMS impractical. Similarly, the implementation of the techniques of the above referenced patents requires expensive microprocessors while the implementation with neural networks and similar trainable pattern recognition technologies permits the use of low cost microprocessors typically costing less than $5.

The present invention uses sophisticated trainable pattern recognition capabilities such as neural networks. Usually the data is preprocessed, as discussed below, using various feature extraction. An example of such a pattern recognition system using neural networks on sonar signals is discussed in two papers by Gorman, R. P. and Sejnowski, T. J. "Analysis of Hidden Units in a Layered Network Trained to Classify Sonar Targets", *Neural Networks*, Vol. 1. pp 75–89, 1988, and "Learned Classification of Sonar Targets Using a Massively Parallel Network", IEEE Transactions on Acoustics, Speech, and Signal Processing, Vol. 36, No. 7, July 1988. Examples of feature extraction techniques can be found in U.S. Pat. No. 4,906,940 entitled "Process and Apparatus for the Automatic Detection and Extraction of Features in Images and Displays" to Green et al. Examples of other more advanced and efficient pattern recognition techniques can be found in U.S. Pat. No. 5,390,136 entitled "Artificial Neuron and Method of Using Same and U.S. patent application Ser. No. 08/076,601 entitled "Neural Network and Method of Using Same" to Wang, S. T. Other examples include U.S. Pat. No. 5,235,339 (Morrison et al.), U.S. Pat. NO. 5,214,744 (Schweizer et al), U.S. Pat. No. 5,181,254 (Schweizer et al), and U.S. Pat. No. 4,881,270 (Knecht et al). All of the above references are included herein by reference.

4. Optics

Optics can be used in several configurations for monitoring the interior of a passenger compartment of an automobile. In one known method, a laser optical system uses a GaAs infrared laser beam to momentarily illuminate an object, occupant or child seat, in the manner as described and illustrated in FIG. 8 of the copending patent application Ser. No. 08/040,978 cross-referenced above. The receiver can be a charge coupled device or CCD, (a type of TV camera) to receive the reflected light. The laser can either be used in a scanning mode, or, through the use of a lens, a cone of light can be created which covers a large portion of the object. In these configurations, the light can be accurately controlled to only illuminate particular positions of interest within the vehicle. In the scanning mode, the receiver need only comprise a single or a few active elements while in the case of the cone of light, an array of active elements is needed. The laser system has one additional significant advantage in that the distance to the illuminated object can be determined as disclosed in the Ser. No. 08/040,978 patent application.

In a simpler case, light generated by a non-coherent light emitting diode device is used to illuminate the desired area. In this case, the area covered is not as accurately controlled and a larger CCD array is required. Recently, however, the cost of CCD arrays has dropped substantially with the result that this configuration is now the most cost-effective system for monitoring the passenger compartment as long as the distance from the transmitter to the objects is not needed. If this distance is required, then either the laser system, a stereographic system, a focusing system, or a combined ultrasonic and optic system is required. A mechanical focusing system, such as used on some camera systems can determine the initial position of an occupant but is too slow to monitor his/her position during a crash. A distance measuring system based of focusing is described in U.S. Pat. No. 5,193,124 (Subbarao) which can either be used with a mechanical focusing system or with two cameras, the latter of which would be fast enough. Although the Subbarao patent provides a good discussion of the camera focusing art and is therefore included herein by reference, it is a more complicated system than is needed for the practicing the instant invention. In fact, a neural network can also be trained to perform the distance determination based on the two images taken with different camera settings or from two adjacent CCD's and lens having different properties as the cameras disclosed in Subbarao making this technique practical for the purposes of this instant invention. Distance can also be determined by the system disclosed in U.S. Pat. No. 5,003,166 (Girod) by the spreading or defocusing of a pattern of structured light projected onto the object of interest.

In each of these cases, regardless of the distance measurement system used, a trained pattern recognition system, as defined above, is used in the instant invention to identify and classify, and in some cases to locate, the illuminated object and its constituent parts.

5. Optics and Acoustics

The laser systems described above are expensive due to the requirement that they be modulated at a high frequency if the distance from the airbag to the occupant, for example, needs to be measured. Both laser and non-laser optical systems in general are good at determining the location of objects within the two dimensional plane of the image and the modulated laser system in the scanning mode can determine the distance of each part of the image from the receiver. It is also possible to determine distance with the non-laser system by focusing as discussed above, or stereographically if two spaced apart receivers are used and, in some cases the mere location in the field of view can be used to estimate the position relative to the airbag, for example. Finally, a recently developed pulsed quantum well diode laser does provide inexpensive distance measurements as discussed below.

Acoustic systems are also quite effective at distance measurements since the relatively low speed of sound permits simple electronic circuits to be designed and minimal microprocessor capability is required. If a coordinate system is used where the z axis is from the transducer to the occupant, acoustics are good at measuring z dimensions while simple optical systems using a single CCD are good at measuring x and y dimensions. The combination of acoustics and optics, therefore, permits all three measurements to be made with low cost components.

One example of a system using these ideas is an optical system which floods the passenger seat with infrared light coupled with a lens and CCD array which receives and displays the reflected light and an analog to digital converter (ADC) which digitizes the output of the CCD and feeds it to an Artificial Neural Network (ANN) or other pattern recognition system , for analysis. This system uses an ultrasonic transmitter and receiver for measuring the distances to the objects located in the passenger seat. The receiving transducer feeds its data into an ADC and from there into the ANN. The same ANN can be used for both systems thereby providing full three-dimensional data for the ANN to analyze. This system, using low cost components, will permit accurate identification and distance measurements not possible by either system acting alone. If a phased array system is added to the acoustic part of the system as disclosed in copending patent application (ATI-102), the optical part can determine the location of the driver's ears, for example, and the phased array can direct a narrow beam to the location and determine the distance to the occupant's ears.

6. Applications

The applications for this technology are numerous as described in the copending patent applications listed above. They include: (i) the monitoring of the occupant for safety purposes to prevent airbag deployment induced injuries, (ii) the locating of the eyes of the occupant to permit automatic adjustment of the rear view mirror(s), (iii) the location of the seat to place the eyes at the proper position to eliminate the parallax in a heads-up display in night vision systems, (iv) the location of the ears of the occupant for optimum adjustment of the entertainment system, (v) the identification of the occupant for security reasons, (vi) the determination of obstructions in the path of a closing door or window, (vii) the determination of the position of the occupant's shoulder so that the seat belt anchorage point can be adjusted for the best protection of the occupant, (viii) the determination of the position of the rear of the occupants head so that the headrest can be adjusted to minimize whiplash injuries in rear impacts, (ix) anticipatory crash sensing, (x) blind spot detection, (xi) smart headlight dimmers, and many others. In fact, over forty products alone have been identified based on the ability to identify and monitor objects and parts thereof in the passenger compartment of an automobile or truck.

SUMMARY OF THE INVENTION

This invention is a system to identify, locate and monitor occupants, including their parts, and other objects in the passenger compartment and objects outside of a motor vehicle, such as an automobile or truck, by illuminating the contents of the vehicle and objects outside of the vehicle with electromagnetic, and specifically infrared, radiation and using one or more lenses to focus images of the contents onto one or more arrays of charge coupled devices (CCD arrays). Outputs from the CCD arrays, are analyzed by appropriate computational means employing trained pattern recognition technologies, to classify, identify or locate the contents or external objects. In general, the information obtained by the identification and monitoring system is used to affect the operation of some other system in the vehicle.

When the vehicle interior monitoring system of this invention is installed in the passenger compartment of an automotive vehicle equipped with a passenger protective device, such as an inflatable airbag, and the vehicle is subjected to a crash of sufficient severity that the crash sensor has determined that the protective device is to be deployed, the system in accordance with the invention determines the position of the vehicle occupant relative to the airbag and disables deployment of the airbag if the occupant is positioned so that he/she is likely to be injured by the deployment of the airbag.

In some implementations of the invention, one or more ultrasonic transmitters and receivers are added to the system to provide a measurement of the distance from the transmitter/receiver to the objects of interest. In some of these implementations, a phased array system is used to permit the ultrasonic waves from the ultrasonic transmitters to be narrowly focused onto a particular location of an object. In other implementations, the source of infrared light is a modulated laser that permits an accurate measurement of the distance to the point of reflection. In still other cases, a focusing system is used to determine the distance to the object. Finally, in yet other cases a GaAs pulsed quantum well laser system is used to measure distance directly to a point of interest.

Principle objects and advantages of the optical sensing system in accordance with the invention are:

1. To recognize the presence of a human on a particular seat of a motor vehicle and to use this information to affect the operation of another vehicle system such as the airbag, heating and air conditioning, or entertainment systems, among others.
2. To recognize the presence of a human on a particular seat of a motor vehicle and then to determine his/her position and to use this position information to affect the operation of another vehicle system.
3. To determine the position, velocity or size of an occupant in a motor vehicle and to utilize this information to control the rate of gas generation, or the amount of gas generated by an airbag inflator system.
4. To determine the presence or position of rear seated occupants in the vehicle and to use this information to affect the operation of a rear seat protection airbag for frontal impacts.
5. To recognize the presence of a rear facing child seat on a particular seat of a motor vehicle and to use this information to affect the operation of another vehicle system such as the airbag system.
6. To determine the approximate location of the eyes of a driver and to use that information to control the position of the rear view mirrors of the vehicle.
7. To monitor the position of the head of the vehicle driver and determine whether the driver is falling asleep or otherwise impaired and likely to lose control of the vehicle and to use that information to affect another vehicle system.
8. To provide an occupant position sensor which reliably permits, and in a timely manner, a determination to be made that the occupant is out of position, or will become out of position, and likely to be injured by a deploying airbag and to then output a signal to suppress the deployment of the airbag.
9. To provide an anticipatory sensor that permits accurate identification of the about-to-impact object in the presence of snow and/or fog whereby the sensor is located within the vehicle.
10. To provide a smart headlight dimmer system which senses the headlights from an oncoming vehicle or the tail lights of a vehicle in front of the subject vehicle and identifies these lights differentiating them from reflections from signs or the road surface and then sends a signal to dim the headlights.
11. To provide a blind spot detector which detects and categorizes an object in the driver's blind spot and warns the driver in the event the driver begins to change lanes, for example, or continuously informs the driver of the state of occupancy of the blind spot.

Accordingly, one embodiment of a system for controlling a vehicular system based on occupancy of an interior passenger compartment of a vehicle comprises transmitter means for transmitting waves into a space in the passenger compartment in which an occupying item might be situated, receiver means for receiving waves transmitted by the transmitter means and modified by passing through the space in the passenger compartment in which the occupying item might be situated; and output means coupled to the receiver means for affecting another system in the vehicle based on the waves received by the receiver means. Processor means may be coupled to the receiver means for generating a signal characteristic of the waves received by the receiver means and identification means coupled to the processor means for identifying an occupying item which might be situated in the space in the passenger compartment based on the signal. The identification means may comprise pattern recognition means for processing the signal to provide an identification of the occupying item based thereon, e.g., by applying a pattern recognition algorithm generated from data of possible occupying items of the vehicle and patterns of received waves from the possible occupying items.

The another system may include an inflatable airbag, in which case, the pattern recognition means process the signal into a positional categorization of the signal characteristic of the position of the occupying item based on data corresponding to patterns of received waves associated with occupying items of the vehicle in different positions. The output means may comprise means for modifying at least one of the time at which inflation of said airbag is initiated, the flow of inflator gas into said airbag and the flow of inflator gas out of said airbag in response to the position of the occupying item. Also, the pattern recognition means may process the signal into a categorization of the signal characteristic of the presence of the occupying item based on data corresponding to patterns of received waves associated with the presence and absence of the occupying item, in which case, the output means preferably comprise means for suppressing deployment of said airbag in response to either the absence of an occupying item, the presence of an out-of-position occupant or the presence of a rear-facing child seat.

The receiver means can comprise at least one receiver array, or more generally, means for converting light into electrical signals. For example, the receiver means may comprise a CMOS dynamic pixel camera, an active pixel camera and/or a HDRC camera.

These and other objects and advantages will become apparent from the following description of the preferred embodiments of the vehicle identification and monitoring system of this invention.

BRIEF DESCRIPTION OF THE DRAWINGS

FIG. 7A is a view of the section designated 7A in FIG. 7.

DESCRIPTION OF THE PREFERRED EMBODIMENTS

Figure 1A:
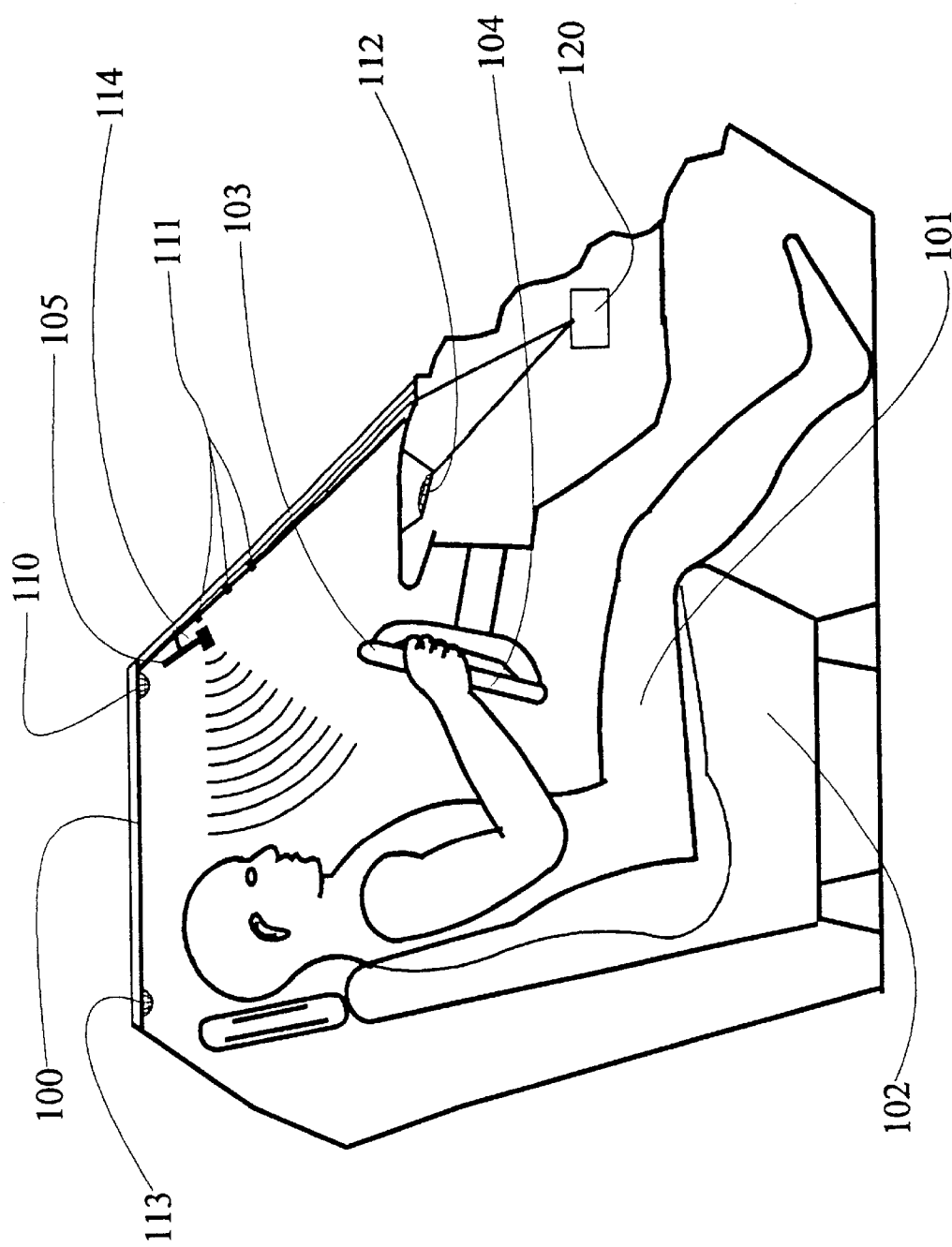
FIG. 1A is a side planar view, with certain portions removed or cut away, of a portion of the passenger compartment of a vehicle showing several preferred mounting locations of interior vehicle monitoring sensors shown particularly for sensing the vehicle driver illustrating the wave pattern from an ultrasonic mirror mounted position sensor.

Referring now to the drawings, a section of the passenger compartment of an automobile is shown generally as 100 in FIGS. 1A through 1E. A driver 101 of a vehicle sits on a seat 102 behind a steering wheel 103 that contains an airbag assembly 104. Five transmitter and/or receiver assemblies 110, 111, 112, 113 and 114 are positioned at various places in the passenger compartment to determine the location of the head, chest and torso of the driver relative to the airbag and to otherwise monitor the interior of the passenger compartment. Control circuitry 120 is connected to the transmitter/receivers 110–114 and controls the transmission from the transmitters and captures the return signals from the receivers. Control circuitry 120 usually contains analog to digital converters (ADCs), a microprocessor containing sufficient memory and appropriate software including pattern recognition algorithms, and other appropriate drivers, signal conditioners, signal generators, etc. Usually, in any given implementation, only one or two of the transmitters and receivers would be used depending on their mounting locations as described below.

FIG. 1A illustrates a typical wave pattern of ultrasonic waves from transmitter/receiver 114. In this embodiment, the transmitter/receiver 114 comprises an ultrasonic transducer that will generally be used in conjunction with an optical transmitter and CCD array such as shown at 110, 112 and 113. The optical systems, i.e., the optical transmitter and CCD array, map the location of the occupant(s), objects and features thereof, in a two dimensional image by the CCD array and ultrasonic transmitter/receiver 114 determines the distance from the sensor to the occupant. When used for monitoring the passenger seat, the optical system 110 determines that the seat is occupied and identifies the occupying item and then the ultrasonic system such as 114 determines the location of the occupant relative to the airbag. The optical system identifies what it is that the ultrasonic system is measuring and determines which echo is from the occupant's head or chest as opposed to some other object. The transmitter/receiver 114 may be mounted to a rear view mirror 105.

In the case of FIG. 1A, transmitter/receiver 114 emits ultrasonic acoustical waves that bounce off the head and chest of the driver and return thereto. Periodically, the device, as commanded by control circuit 120, transmits a burst of ultrasonic waves at about 50 kilohertz, for example, and the reflected signal is detected by the same or a different device. An associated electronic circuit or algorithm in control circuit 120 measures the time between the transmission and the reception of the ultrasonic waves and thereby determines the distance from the transmitter/receiver to the driver, passenger or other occupying item based on the velocity of sound. This information is then sent to the crash sensor and diagnostic circuitry, which may also be resident in 120, which determines if the occupant is close enough to the airbag that a deployment might, by itself, cause injury which exceeds that which might be caused by the accident itself. In such a case, the circuit disables the airbag system and thereby prevents its deployment. In an alternate case, the sensor algorithm assesses the probability that a crash requiring an airbag is in process and waits until that probability exceeds an amount that is dependent on the position of the occupant. Thus, for example, the sensor might decide to deploy the airbag based on a need probability assessment of 50%, if the decision must be made immediately for an occupant approaching the airbag, but might wait until the probability rises to 95% for a more distant occupant. Although a driver system has been illustrated, the front and rear seat passenger systems would be similar.

In another implementation, the sensor algorithm may determine the rate that gas is generated to affect the rate that the airbag is inflated. In all of these cases, the position of the occupant is used to affect the deployment of the airbag either as to whether or not it should be deployed at all, the time of deployment or the rate of inflation.

Figure 1B:
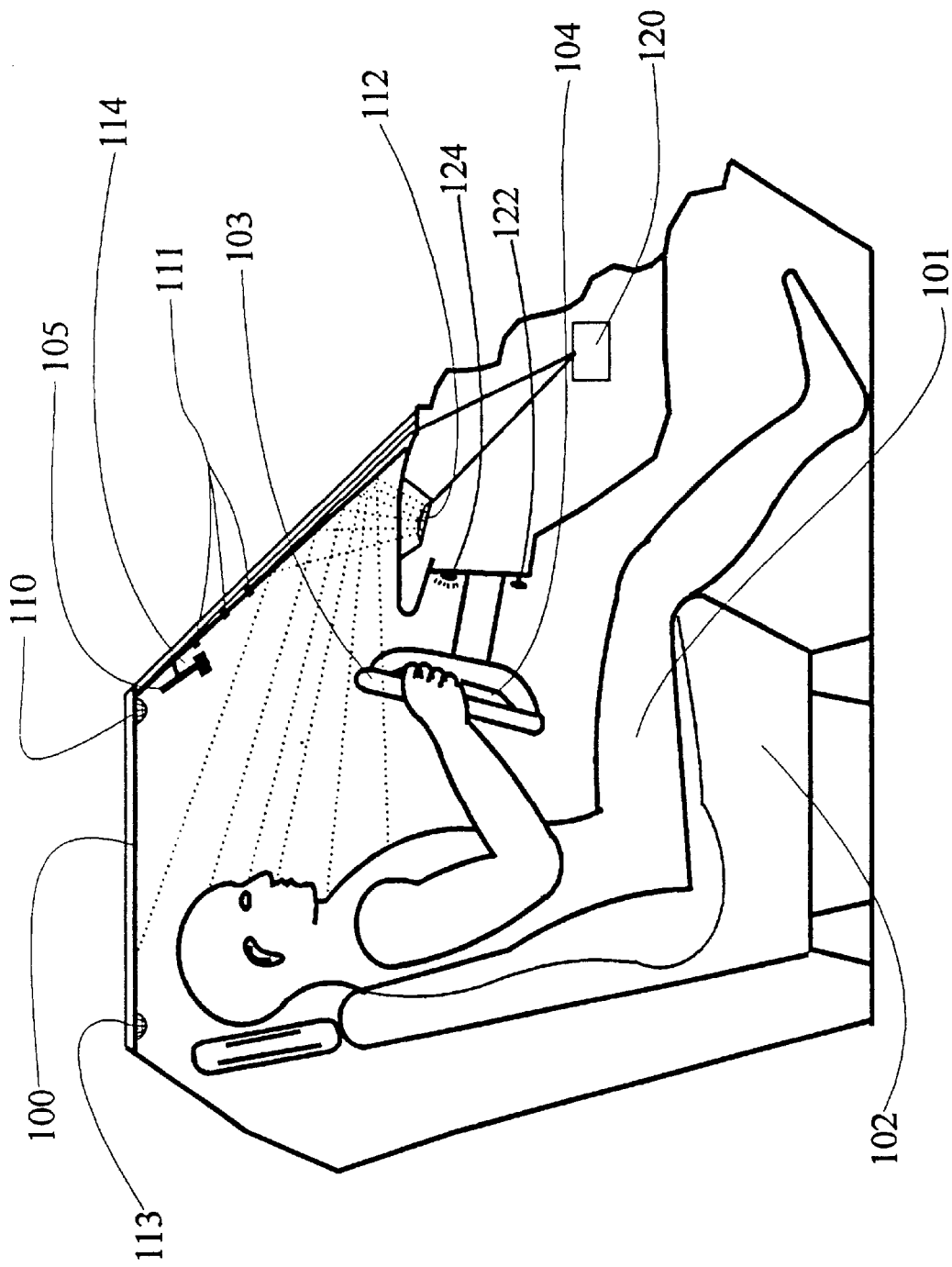
FIG. 1B is a view as in FIG. 1A illustrating the wave pattern from an optical system using an infrared light source and a CCD array receiver using the windshield as a reflection surface and showing schematically the interface between the vehicle interior monitoring system of this invention and an instrument panel mounted inattentiveness warning light or buzzer and reset button.

An optical infrared transmitter and receiver assembly is shown generally at 112 in FIG. 1B and is mounted onto the instrument panel facing the windshield. Device 112, shown enlarged, comprises a source of infrared radiation, or another form of electromagnetic radiation, and a charge coupled device array (CCD array) of typically 160 pixels by 160 pixels. In this embodiment, the windshield is used to reflect the illumination light provided by the infrared radiation and also the light reflected back by the objects in the passenger compartment, in a manner similar to the "heads-up" display which is now being offered on several automobile models. The "heads-up" display, of course, is currently used only to display information to the driver and is not used to reflect light from the driver to a receiver. Once again, unless one of the distance measuring systems as described below is used, this system alone cannot be used to determine distances from the objects to the sensor. Its main purpose is object identification and monitoring.

Device 112 is actually about two cm. in diameter and is shown greatly enlarged in FIG. 1B. Also, the reflection area on the windshield is considerably smaller than illustrated and special provisions are made to assure that this area of the windshield is flat and reflective as is done generally when heads-up displays are used.

The system illustrated in FIG. 1B uses a single CCD array and thus, since this device is small, it cannot in general be used to achieve a stereographic image and thus some other method is necessary to determine the distance to the object. If two spaced apart CCD arrays are used, however, then the distance to the various objects within the passenger compartment can be found by using a simple algorithm which locates similar features on both images and determines their relative location on the images. An alternate method is to use a lens with a short focal length. In this case, the lens is mechanically focused to determine the clearest image and thereby obtain the distance to the object. This is similar to certain camera auto-focusing systems such as one manufactured by Fuji of Japan. Naturally, other methods can be used as described in the patents referenced above.

Once a vehicle interior monitoring system employing a sophisticated pattern recognition system, such as a neural network is in place, it is possible to monitor the motions of the driver over time, and his/her response to various stimuli, and determine if he is falling asleep or has otherwise become incapacitated. In such an event, the vehicle can be caused to respond in a number of different ways. One such system is illustrated in FIG. 1B and consists of a monitoring system having transducer device 112 plus a microprocessor in control circuit 120 programmed to compare the motions of the driver over time and trained to recognize changes in behavior representative of becoming incapacitated. If the system determines that there is a reasonable probability that the driver has fallen asleep, for example, then it can activate an alarm, e.g., turn on a warning light shown here as 124 or send a warning sound. If the driver fails to respond to the warning by pushing a button 122, for example, then the horn and lights can be operated in a manner to warn other vehicles and the vehicle brought to a stop. Naturally other responses can also be programmed and other tests of driver attentiveness can be used without resorting to attempting to monitor the motions of the driver's eyes.

An even more sophisticated system of monitoring the behavior of the driver is to track the driver's eye motions using such techniques as are described in: Freidman et al., U.S. Pat. No. 4,648,052 entitled "Eye Tracker Communication System"; Heyner et al., U.S. Pat. No. 4,720,189 entitled "Eye Position Sensor"; Hutchinson, U.S. Pat. No. 4,836,670 entitled "Eye Movement Detector"; and Hutchinson, U.S. Pat. No. 4,950,069 entitled "Eye Movement Detector With Improved Calibration and Speed", all of which are included herein by reference as well as U.S. Pat. Nos. 5,008,946 and 5,305,012 referenced above. The detection of the impaired driver in particular can be best determined by these techniques. These systems make use of sophisticated pattern recognition techniques plus, in many cases, the transmitter and CCD receivers must be appropriately located so that the reflection off of the cornea of the driver's eyes can be detected as discussed in the above referenced patents. The size of the CCD arrays used herein permits their location, sometimes in conjunction with a reflective windshield, where this corneal reflection can be detected with some difficulty. Naturally sunglasses can interfere with this process.

The eye tracker systems discussed above are facilitated by the instant invention since one of the main purposes of determining the location of the driver's eyes either by directly locating them with trained pattern recognition technology or by inferring their location from the location of the driver's head, is so that the seat can be automatically positioned to place the driver's eyes into the "eye-ellipse". The eye-ellipse is the proper location for the driver's eyes to permit optimal operation of the vehicle and for the location of the mirrors etc. Thus, if we know where the driver's eyes are, then the driver can be positioned so that his or her eyes are precisely situated in the eye ellipse and the reflection off of the eye can be monitored with a small eye tracker system. Also, by ascertaining the location of the driver's eyes, a rear view mirror positioning device can be controlled to adjust the same to an optimal position.

Figure 1C:
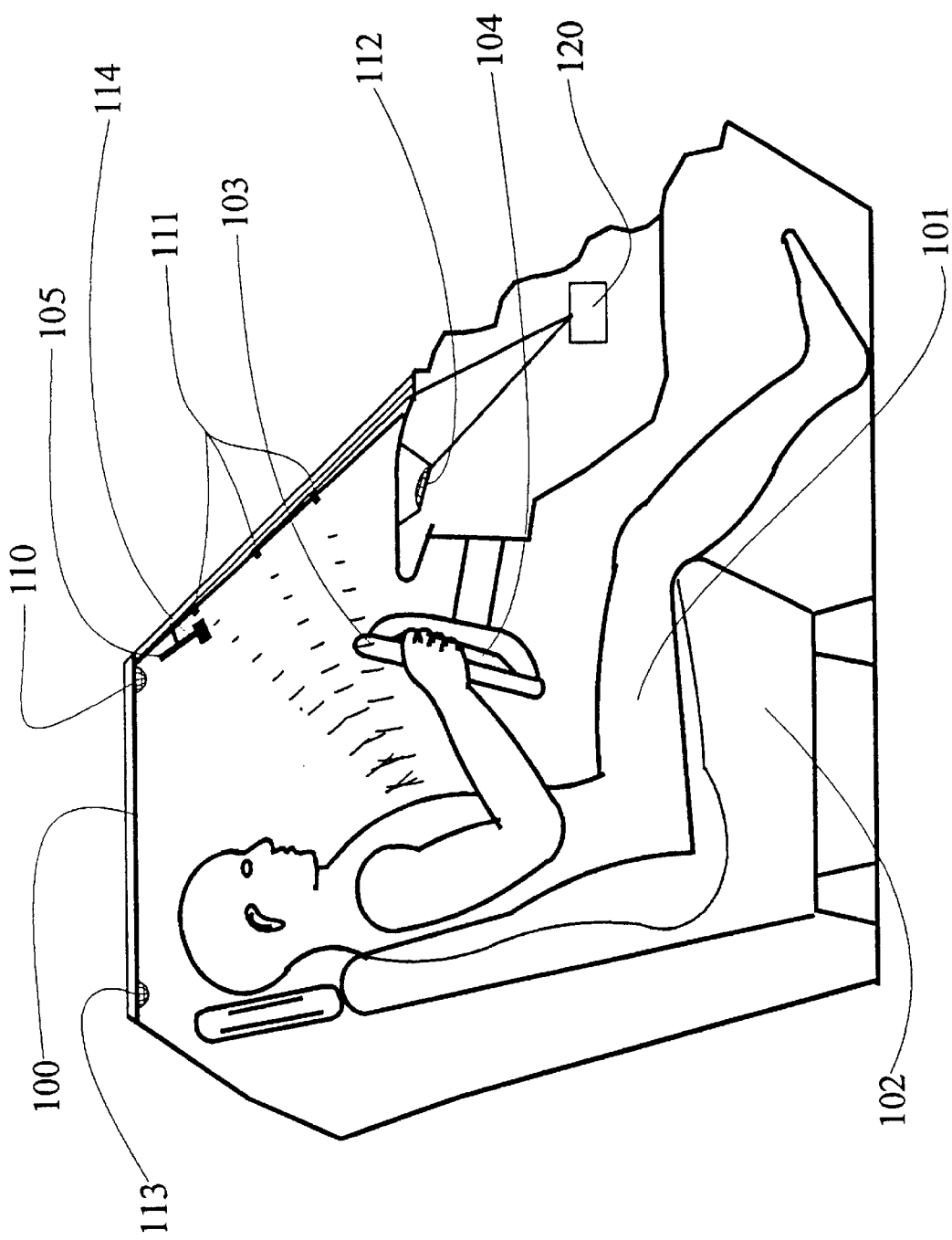
FIG. 1C is a view as in FIG. 1A illustrating the wave pattern from a set of ultrasonic transmitters/receivers where the spacing of the transducers and the phase of the signals permits an accurate focusing of the ultrasonic beam and thus the accurate measurement of a particular point on the surface of the driver.

A more accurate acoustic system for determining the distance to a particular object, or a part thereof, in the passenger compartment is exemplified by transducers 111 in FIG. 1C. In this case, three ultrasonic transmitter/receivers are shown spaced apart mounted onto the A-pillar of the vehicle. The A-pillar is the forward most roof support pillar and also supports the windshield. Due to the wavelength, it is difficult to get a narrow beam using ultrasonics without either using high frequencies that have limited range or a large transducer. A commonly available 40 kHz transducer, for example, is about 1 cm. in diameter and emits a sonic wave that spreads at about a sixty-degree angle. To reduce this angle requires making the transducer larger in diameter. An alternate solution is to use several transducers and to phase the transmissions so that they arrive at the intended part of the target in phase. Reflections from the selected part of the target are then reinforced whereas reflections from adjacent parts encounter interference with the result that the distance to the brightest portion within the vicinity of interest can be determined. By varying the phase of transmission from the three transducers 111, the location of a reflection source on a curved line can be determined. In order to locate the reflection source in space, at least one additional transmitter/receiver is required which is not co-linear with the others. The accuracy of the measurement can be determined by those skilled in the art of phased array radar as the relevant equations are applicable here. The waves shown in FIG. 1C coming from the three transducers 111 are actually only the portions of the waves which arrive at the desired point in space together in phase. The effective direction of these wave streams can be varied by changing the transmission phase between the three transmitters. A determination of the approximate location of a point of interest on the occupant is accomplished by the CCD array and appropriate analysis and the phasing of the ultrasonic transmitters is determined so that the distance to the desired point can be determined.

Figure 1D:
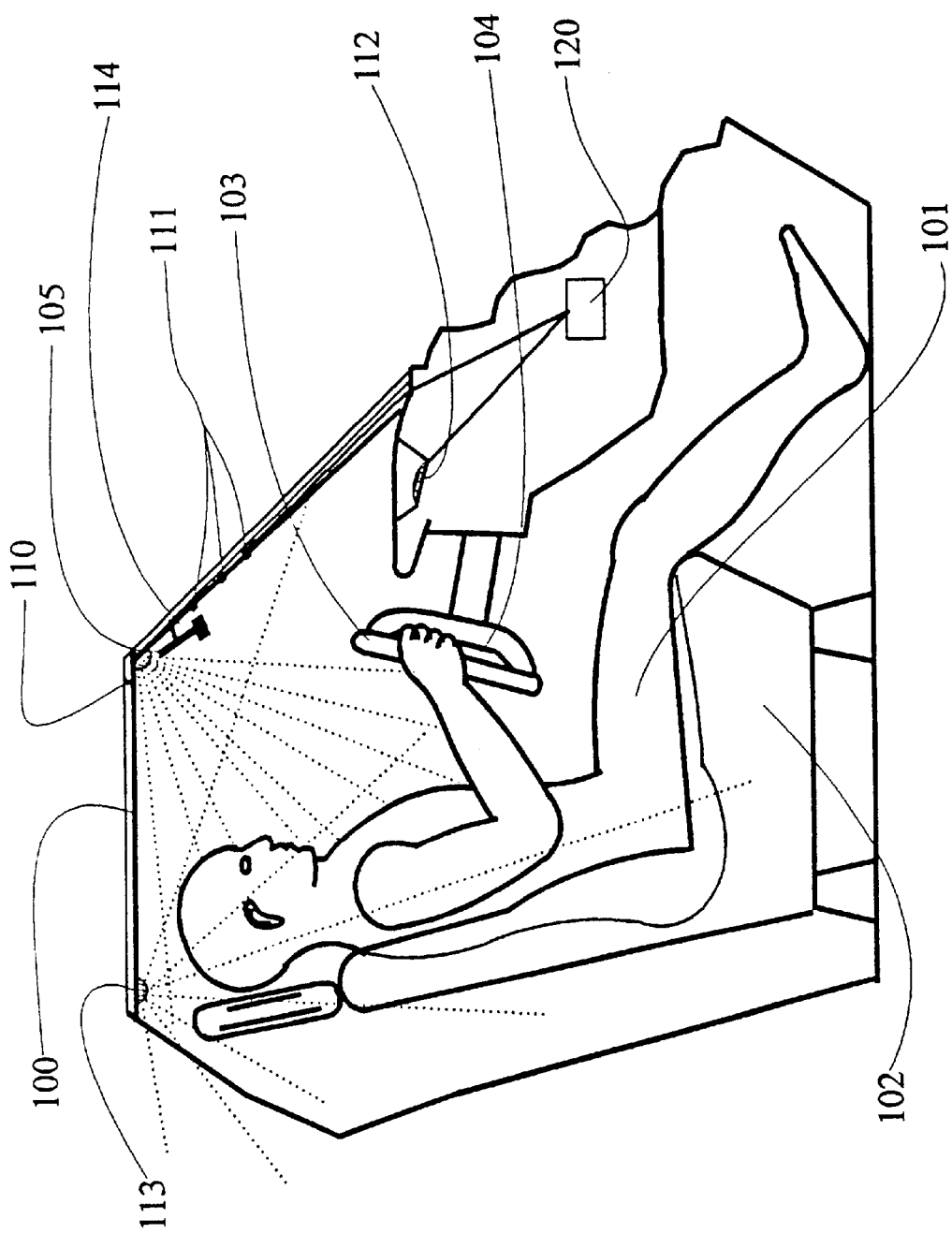
FIG. 1D is a view as in FIG. 1A illustrating the wave pattern from an optical system using an infrared light source and a CCD array receiver where the CCD array receiver is covered by a fisheye lens permitting a wide angle view of the contents of the passenger compartment.

FIG. 1D illustrates two optical systems each having a source of infrared radiation and a CCD array receiver. The price of CCD arrays has dropped dramatically in the last year making them practical for interior monitoring. Transducers 110 and 113 are CCD arrays having 160 by 160 pixels which is covered by an approximate spherical lens. This creates a "fisheye" effect whereby light from a wide variety of directions can be captured. One such sensor placed by the dome light or other central position in the vehicle roof such as 113, can monitor the entire vehicle interior with sufficient resolution to determine the occupancy of the vehicle, for example. CCD's such as those used herein are available from Marshall Electronics Inc. of Culver City, Calif. A fisheye lens is " . . . a wide-angle photographic lens that covers an angle of about 180°, producing a circular image with exaggerated foreshortening in the center and increasing distortion toward the periphery". (*The American Heritage Dictionary of the English Language, Third Edition,* 1992 by Houghton Mifflin Company). This distortion of a fisheye lens can be substantially changed by modifying the shape of the lens to permit particular portions of the interior passenger compartment to be observed. Also, in many cases the full 180° is not desirable and a lens which captures a smaller angle may be used. Although primarily spherical lenses are illustrated herein, it is understood that the particular lens design will depend on the location in the vehicle and the purpose of the particular receiver.

Figure 1E:
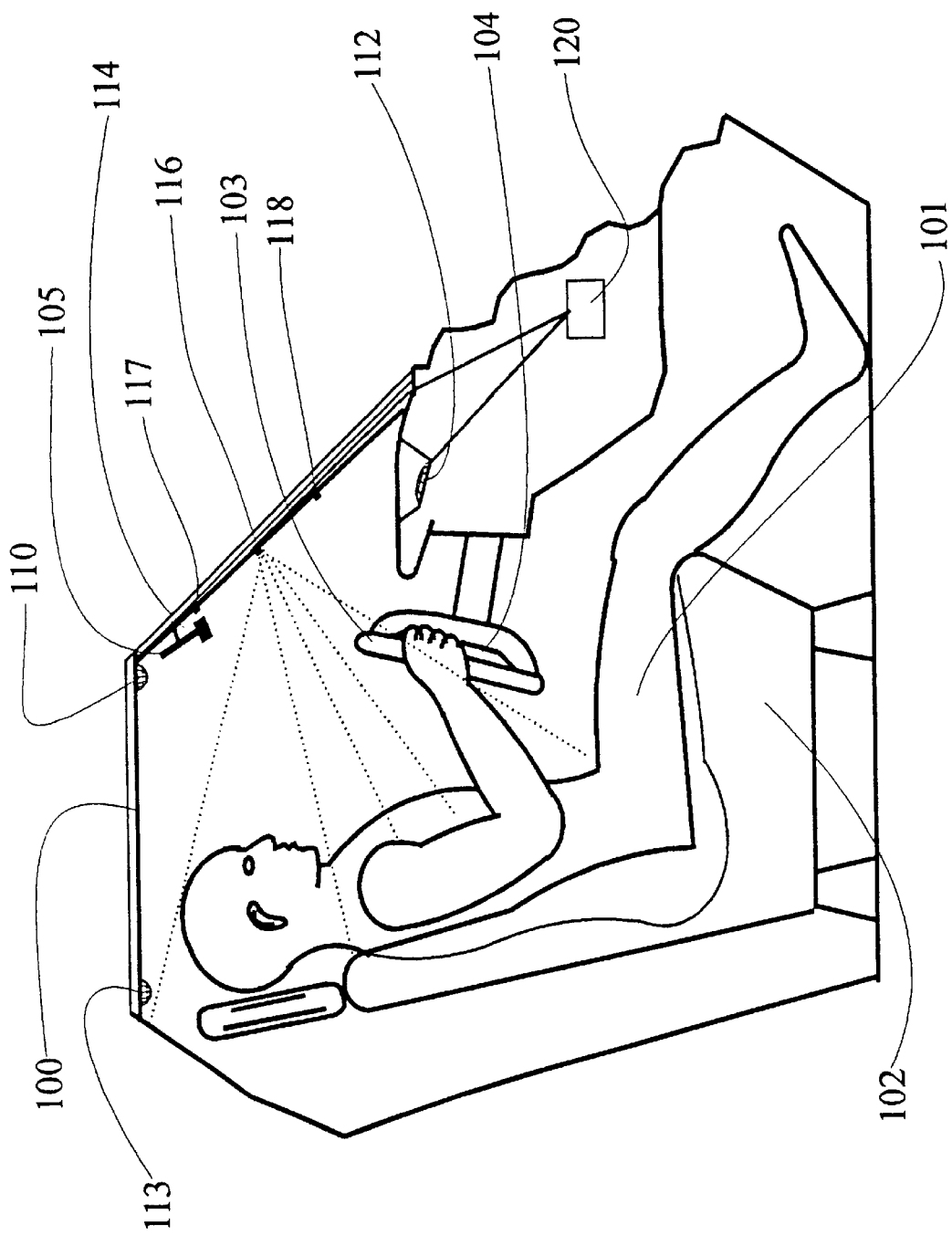
FIG. 1E is a view as in FIG. 1A illustrating the wave pattern from a pair of small CCD array receivers and one infrared transmitter where the spacing of the CCD arrays permits an accurate measurement of the distance to features on the occupant.

CCD arrays are in common use in television cameras, for example, to convert an image into an electrical signal. For the purposes herein, a CCD will be defined to include all devices that are capable of converting light frequencies, including infrared and ultraviolet, into electrical signals. Such equivalent devices include receiver arrays, active and dynamic pixel cameras, e.g., a CMOS dynamic pixel camera, as well as HDRC (high dynamic range camera) cameras. The particular CCD array used for many of the applications disclosed herein is implemented on a single chip that is less than two cm. in diameter. Data from the CCD array is digitized and sent serially to an electronic circuit 120 containing a microprocessor for analysis of the digitized data. In order to minimize the amount of data that needs to be stored, initial processing of the image data takes place as it is being received from the CCD array. One method of determining distance to an object directly without resorting to rangefinders is to used a mechanical focusing system. However, the use of such an apparatus is cumbersome, expensive, slow and has questionable reliability. An alternative is to use the focusing systems described in the above referenced U.S. Pat. Nos. 5,193,124 and 5,003,166 however such systems require expensive hardware and/or elaborate algorithms. Another alternative is illustrated in FIG. 1E where transducer 116 is an infrared source having a wide transmission angle such that the entire contents of the front driver's seat is illuminated. Receiving CCD transducers 117 and 118 are shown spaced apart so that a stereographic analysis can be made by the control circuitry 120. This circuitry 120 contains a microprocessor with appropriate pattern recognition algorithms along with other circuitry as described above. In this case, the desired feature to be located is first selected from one of the two returned images from either CCD transducer 117 or 118. The software then determines the location of the same feature on the other image and thereby, through analysis familiar to those skilled in the art, determines the distance of the feature from the transducers.

Transducers 116–118 are illustrated mounted onto the A-pillar of the vehicle, however, since these transducers are quite small, typically approximately 2 cm. or less in diameter, they could alternately be mounted onto the windshield itself, or other convenient location which provides a clear view of the portion of the passenger compartment being monitored.

A new class of laser range finders has particular application here. This product, as manufactured by Power Spectra, Inc. of Sunnyvale, Calif., is a GaAs pulsed laser device which can measure up to 30 meters with an accuracy of<2 cm. and a resolution of<1 cm. This system is implemented in combination with transducer 116 and one of the receiving transducers 117 or 118 may thereby be eliminated. Once a particular feature of an occupying item of the passenger compartment has been located, this device is used in conjunction with an appropriate aiming mechanism to direct the laser beam to that particular feature. The distance to that feature is then known to within 2 cm, and with calibration even more accurately. Note that in addition to measurements within the passenger compartment, this device has particular applicability in anticipatory sensing and blind spot monitoring applications exterior to the vehicle.

Figure 2:
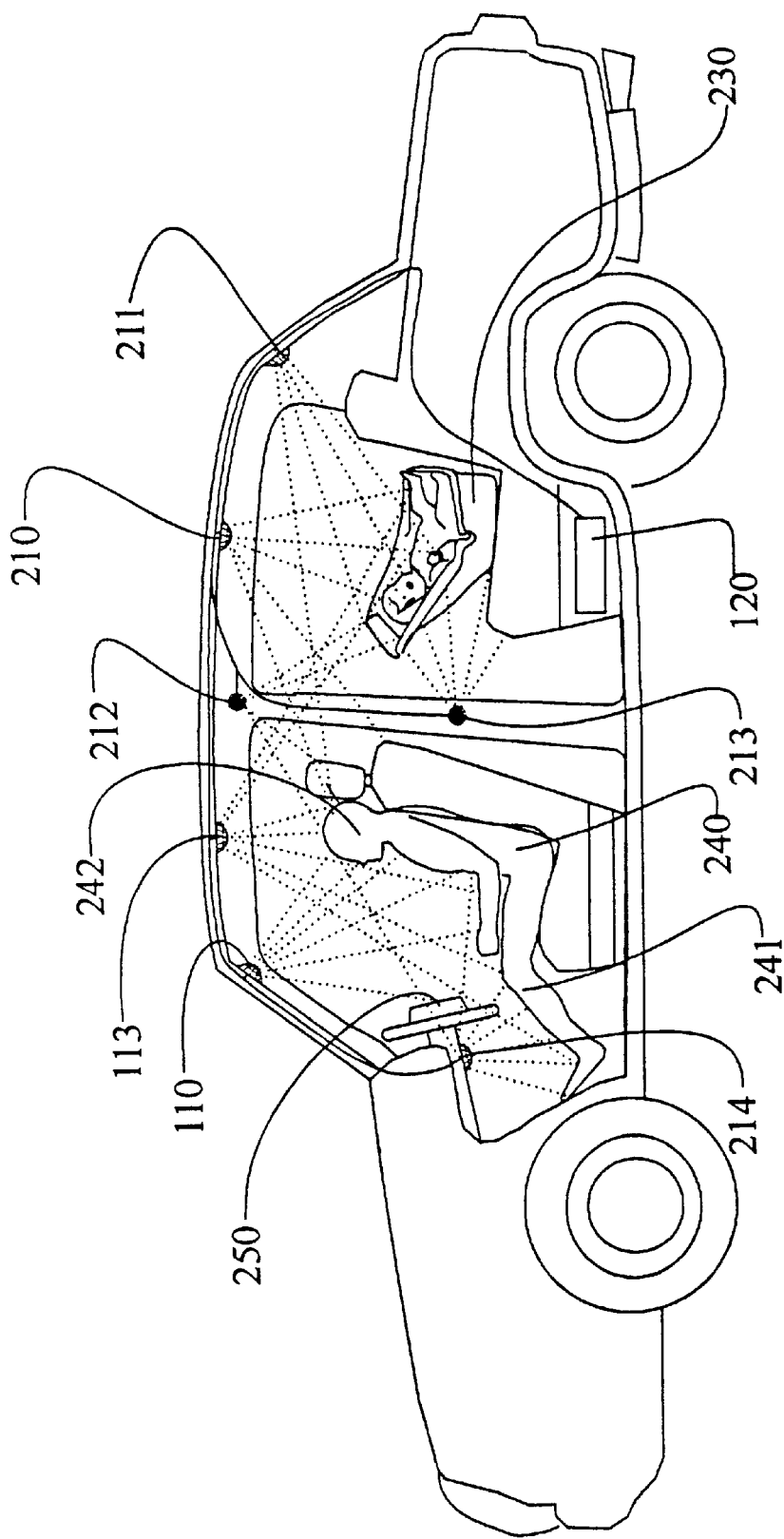
FIG. 2 is a side view, with certain portions removed or cut away, of a portion of the passenger compartment of a vehicle showing preferred mounting locations of optical interior vehicle monitoring sensors.

In FIG. 2 a side view, with certain portions removed or cut away, of a portion of the passenger compartment of a vehicle showing preferred mounting locations of optical interior vehicle monitoring sensors 110, 113, 210–214. Each of these devices is illustrated as having a fisheye lens and is shown enlarged in size for clarity. In a typical actual device, the diameter of the lens is approximately 2 cm. and it protrudes from the mounting surface by approximately 1 cm. This small size renders these devices almost unnoticeable by vehicle occupants. Note that since these devices are optical it is important that the lens surface remains relatively clean. Control circuitry 120 contains a self-diagnostic feature where the image returned by one of the transducers is compared with a stored image and the existence of certain key features is verified. If a receiver fails this test, a warning is displayed to the driver which indicates that cleaning of the lens surface is required. The technology illustrated in FIG. 2 can be used for numerous purposes including: (i) the determination of the presence of a rear facing child seat 230, (ii) the monitoring of the rear of an occupant's head 242, (iii) the monitoring of the position of occupant 240, (iv) the monitoring of the position of the occupants knees 241, (v) the measurement of the occupant's height using transducer 113, as well as other monitoring functions as described elsewhere in this specification.

Figure 3:
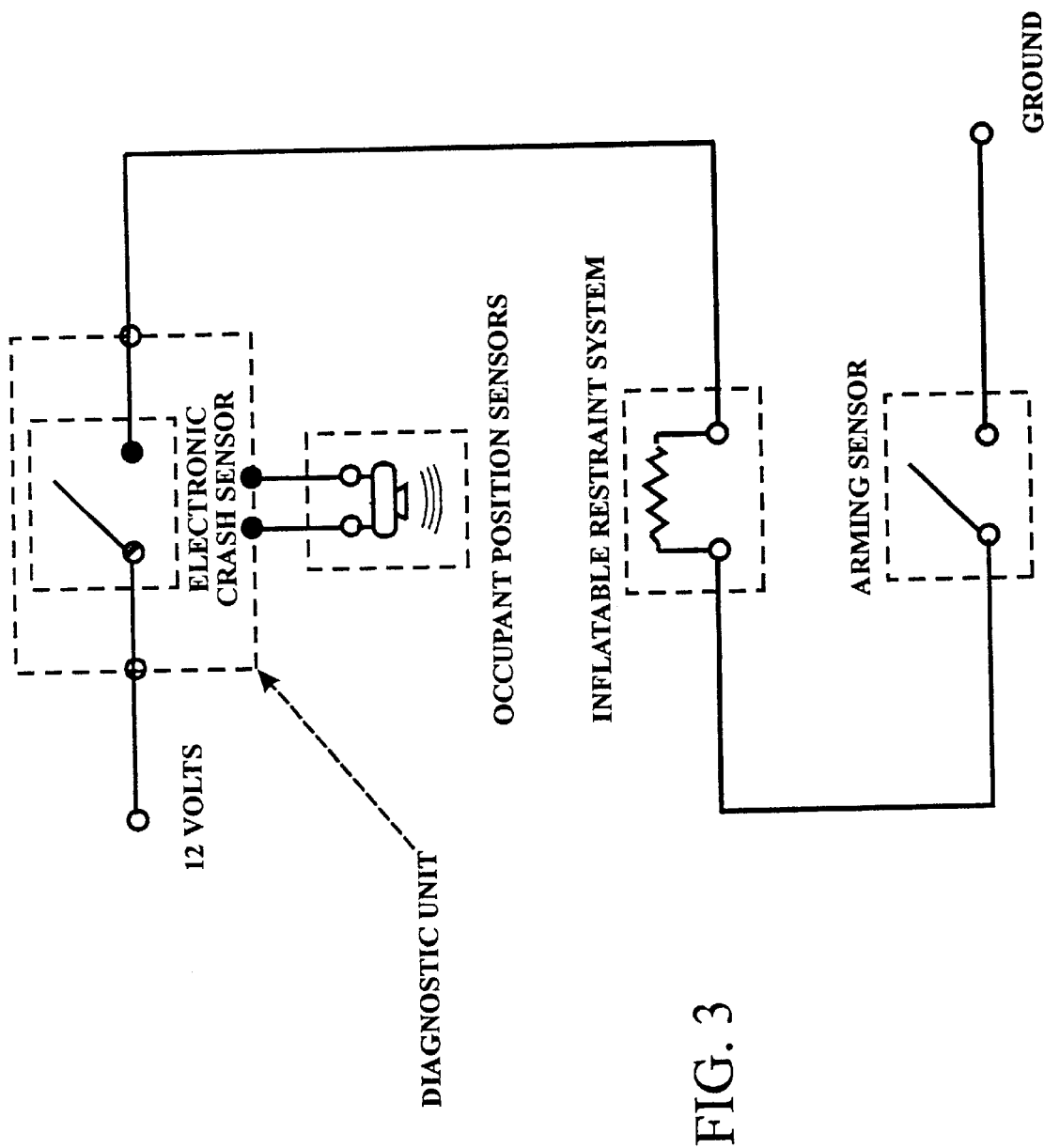
FIG. 3 is a circuit schematic illustrating the use of the vehicle interior monitoring sensor used as an occupant position sensor in conjunction with the remainder of the inflatable restraint system.

The occupant position sensor in any of its various forms is integrated into the airbag system circuitry as shown schematically in FIG. 3. In this example, the occupant position sensors are used as an input to a smart electronic sensor and diagnostic system. The electronic sensor determines whether the airbag should be deployed based on the vehicle acceleration crash pulse, or crush zone mounted crash sensors, and the occupant position sensor determines whether the occupant is too close to the airbag and therefore that the deployment should not take place. In FIG. 3 the electronic crash sensor located within the sensor and diagnostic unit determines whether the crash is of such severity as to require deployment of the airbag. The occupant position sensors determine the location of the vehicle occupants relative to the airbags and provide this information to the sensor and diagnostic unit which then determines whether it is safe to deploy the airbag. The arming sensor also determines whether there is a vehicle crash occurring. If the sensor and diagnostic unit and the arming sensor both determine that the vehicle is undergoing a crash requiring an airbag and the position sensors determine that the occupants are safely away from the airbags, the airbag, or inflatable restraint system, is deployed.

Figure 4:
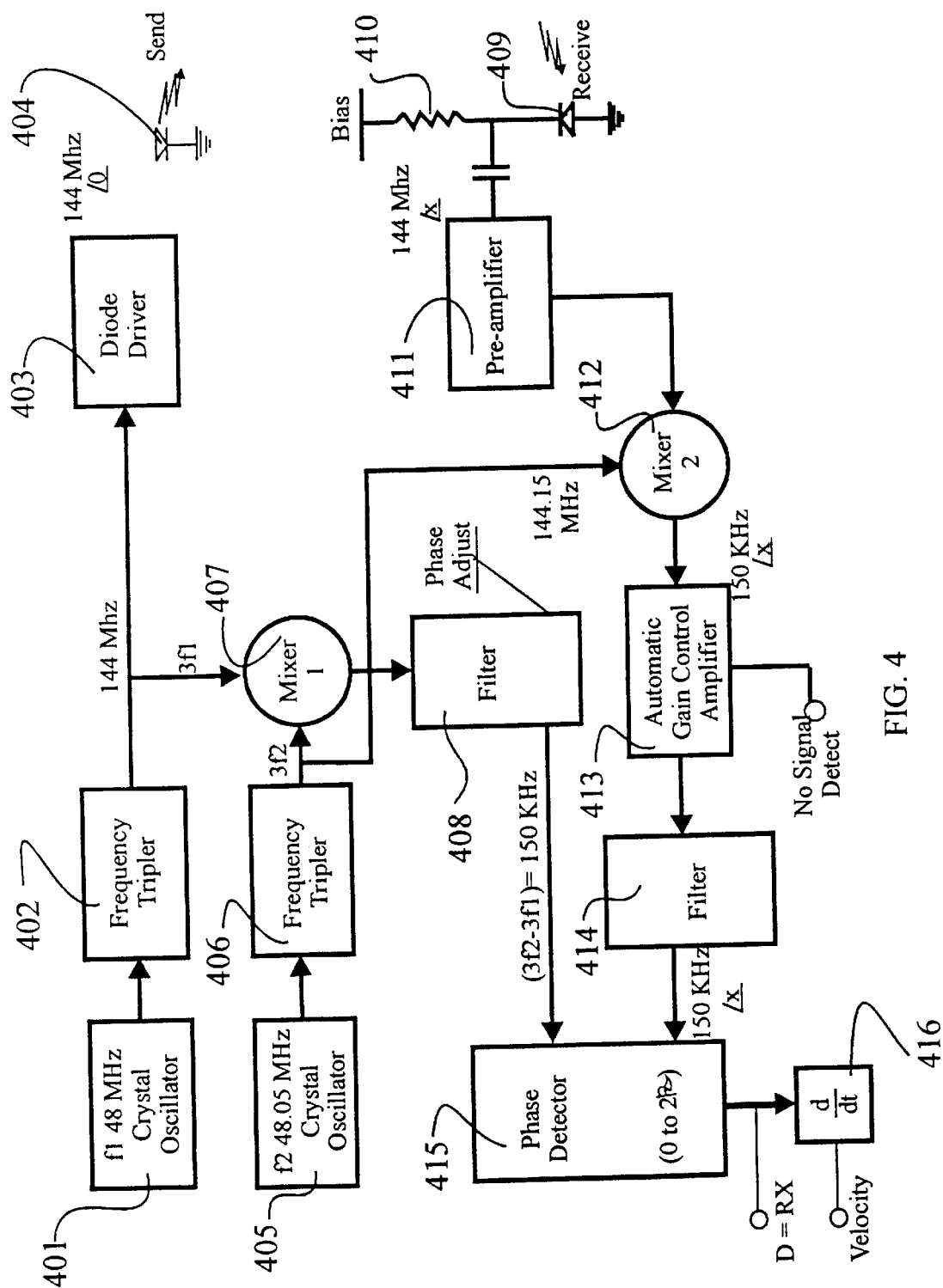
FIG. 4 is a schematic illustrating the circuit of an occupant position-sensing device using a modulated infrared signal, beat frequency and phase detector system.

A particular implementation of an occupant position sensor having a range of from 0 to 2 meters (corresponding to an occupant position of from 0 to 1 meter since the signal must travel both to and from the occupant) using infrared is illustrated in the block diagram schematic of FIG. 4. The operation is as follows. A 48 MHz signal, f1, is generated by a crystal oscillator 401 and fed into a frequency tripler 402 which produces an output signal at 144 MHz. The 144 MHz signal is then fed into an infrared diode driver 403 which drives the infrared diode 404 causing it to emit infrared light modulated at 144 MHz and a reference phase angle of zero degrees. The infrared diode 404 is directed at the vehicle occupant. A second signal f2 having a frequency of 48.05 MHz, which is slightly greater than f1, is similarly fed into a frequency tripler 406 to create a frequency of 144.15 MHz. This signal is then fed into a mixer 407 which combines it with the 144 MHz signal from frequency tripler 402. The combined signal from the mixer 407 is then fed to filter 408 which removes all signals except for the difference, or beat frequency, between 3 times f1 and 3 times f2, of 150 kHz. The infrared signal which is reflected from the occupant is received by receiver 409 and fed into pre-amplifier 411, a resistor 410 to bias being coupled to the connection between the receiver 409 and the pre-amplifier 411. This signal has the same modulation frequency, 144 MHz, as the transmitted signal but now is out of phase with the transmitted signal by an angle x due to the path that the signal took from the transmitter to the occupant and back to the receiver. The output from pre-amplifier 411 is fed to a second mixer 412 along with the 144.15 MHz signal from the frequency tripler 406. The output from mixer 412 is then amplified by an automatic gain amplifier 413 and fed into filter 414. The filter 414 eliminates all frequencies except for the 150 kHz difference, or beat, frequency, in a similar manner as was done by filter 408. The resulting 150 kHz frequency, however, now has a phase angle x relative to the signal from filter 408. Both 150 kHz signals are now fed into a phase detector 415 which determines the magnitude of the phase angle x. It can be shown mathematically that, with the above values, the distance from the transmitting diode to the occupant is x/345.6 where x is measured in degrees and the distance in meters.

The applications described herein have been illustrated using the driver of the vehicle. Naturally the same systems of determining the position of the occupant relative to the airbag apply to front and rear seated passengers, sometimes requiring minor modifications. It is likely that the sensor required triggering time based on the position of the occupant will be different for the driver than for the passenger. Current systems are based primarily on the driver with the result that the probability of injury to the passenger is necessarily increased either by deploying the airbag too late or by failing to deploy the airbag when the position of the driver would not warrant it but the passenger's position would. With the use of occupant position sensors for both the passenger and driver, the airbag system can be individually optimized for each occupant and result in further significant injury reduction. In particular, either the driver or passenger system can be disabled if either the driver or passenger is out of position.

There is almost always a driver present in vehicles that are involved in accidents where an airbag is needed. Only about 30% of these vehicles, however, have a passenger. If the passenger is not present, there is usually no need to deploy the passenger side airbag. The occupant monitoring system, when used for the passenger side with proper pattern recognition circuitry, can also ascertain whether or not the seat is occupied, and if not, can disable the deployment of the passenger side airbag and thereby save the cost of its replacement. The same strategy applies also for monitoring the rear seat of the vehicle. Also, a trainable pattern recognition system, as used herein, can distinguish between an occupant and a bag of groceries, for example. Finally, there has been much written about the out of position child who is standing or otherwise positioned adjacent to the airbag, perhaps due to pre-crash braking. Naturally, the occupant position sensor described herein can prevent the deployment of the airbag in this situation as well as in the situation of a rear facing child seat as described above.

The use of trainable pattern recognition technologies such as neural networks is an important part of the instant invention. These technologies are implemented using sophisticated computer programs to analyze the patterns of examples to determine the differences between different categories of objects. These computer programs are trained using a set of representative data collected during the training phase, called the training set. After training, the computer programs output a computer algorithm containing the rules permitting classification of the objects of interest based on the data obtained after installation in the vehicle. These rules, in the form of an algorithm, are implemented in the system which is mounted onto the vehicle. The determination of these rules is central to the pattern recognition techniques used in this invention. Artificial neural networks are thus far the most successful of the rule determination approaches however research is underway to develop newer systems with many of the advantages of neural networks, such as learning by training, without the disadvantages, such as the inability to understand the network and the possibility of not converging to the best solution.

In some implementations of this invention, such as the determination that there is an object in the path of a closing window as described below, the rules are sufficiently obvious that a trained researcher can look at the returned optical or acoustic signals and devise an algorithm to make the required determinations. In others, such as the determination of the presence of a rear facing child seat or of an occupant, artificial neural networks are used to determine the rules. One such set of neural network software for determining the pattern recognition rules, is available from the NeuralWare Corporation of Pittsburgh, Pa. Another network pattern recognition technology is disclosed in the above referenced Motorola patents. Numerous articles, including more that 500 U.S. patents, describe neural networks in great detail and thus the theory and application of this technology is well known and will not be repeated here. Except in a few isolated situations where neural networks have been used to solve particular problems, they have not heretofore been applied to automobiles and trucks.

The system used in the instant invention, therefore, for the determination of the presence of a rear facing child seat, of an occupant, or of an empty seat is the artificial neural network. In this case, the network operates on the returned signals from the CCD array as sensed by transducers 521 and 522 in FIG. 5, for example. For the case of the front passenger seat, for example, through a training session, the system is taught to differentiate between the three cases. This is done by conducting a large number of experiments where available child seats are placed in numerous positions and orientations on the front passenger seat of the vehicle. Similarly, a sufficiently large number of experiments are run with human occupants and with boxes, bags of groceries and other objects. As many as 1000 such experiments are run before the neural network is sufficiently trained so that it can differentiate among the three cases and output the correct decision with a very high probability.

Once the network is determined, it is possible to examine the result using tools supplied by NeuralWare, for example, to determine the rules which were finally arrived at by the trial and error techniques. In that case, the rules can then be programmed into a microprocessor. Alternately, a neural computer can be used to implement the net directly. In either case, the implementation can be carried out by those skilled in the art of pattern recognition using neural networks. If a microprocessor is used, a memory device is also required to store the data from the analog to digital converters which digitize the data from the receiving transducers. On the other hand, if a neural network computer is used, the analog signal can be fed directly from the transducers to the neural network input nodes and an intermediate memory is not required. Memory of some type is needed to store the computer programs in the case of the microprocessor system and if the neural computer is used for more than one task, a memory is needed to store the network specific values associated with each task.

Figure 5:
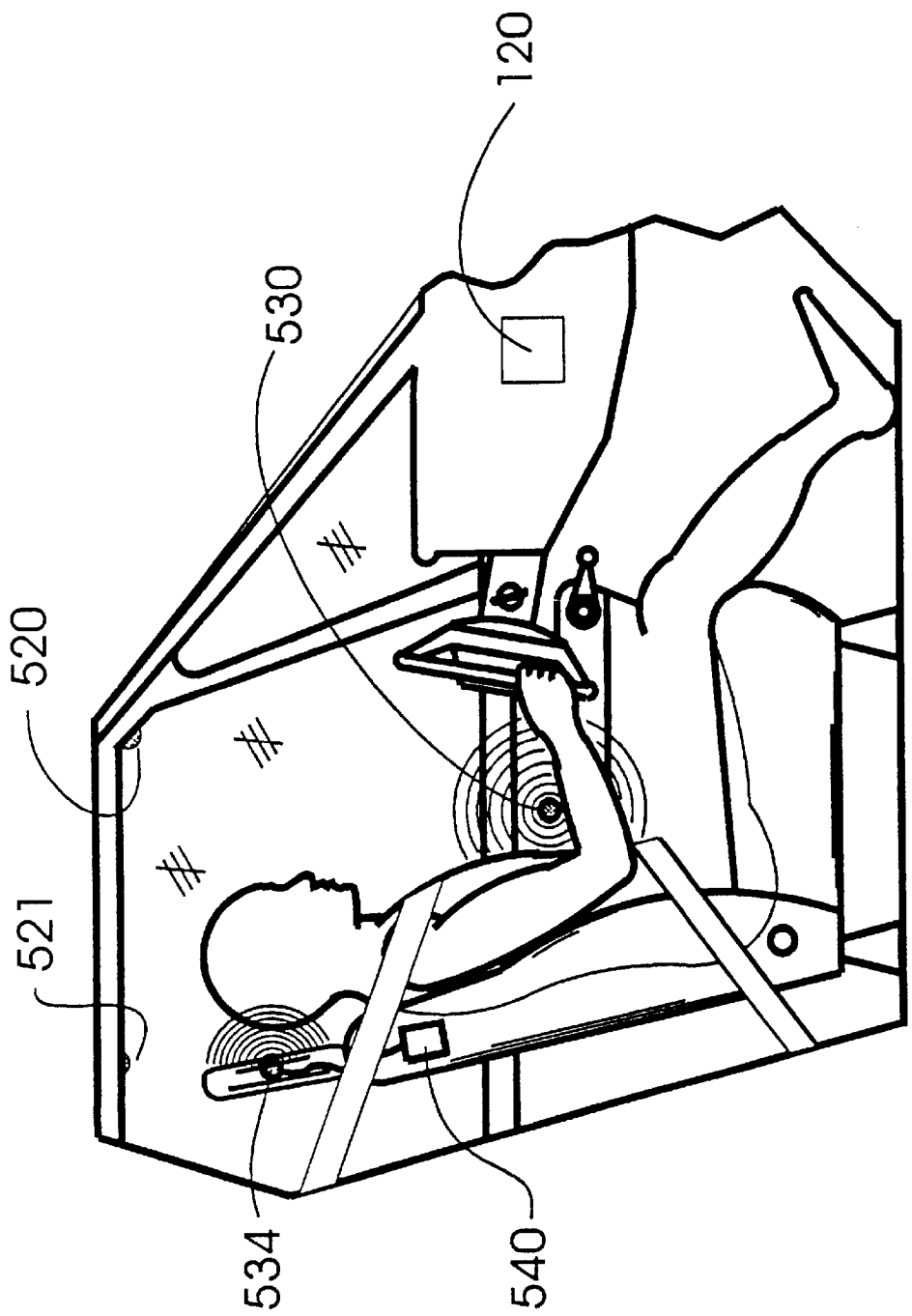
FIG. 5 is a side planer view with parts cutaway and removed of a vehicle showing the passenger compartment containing a driver and a preferred mounting location for an occupant position sensor for use in side impacts and also of a rear of occupant's head locator for use with a headrest adjustment system to reduce whiplash injuries in rear impact crashes.

There are several methods measuring the height of the driver for use in automatically adjusting the seat or for adjusting the seatbelt anchorage point. Some alternatives are shown in FIG. 5 which is a side plan view where two height measuring sensors, one 521 mounted into the headliner above the occupant's head and the other 520 mounted onto the A-pillar are shown. These transducers may already be present because of other implementations of the vehicle interior identification and monitoring system described herein.

In the above cross-referenced patent applications, ultrasonics was the main technology for determining occupant height. This generally required at least two transducers since by using transducer 521 alone, for example, the exact position of the head is ambiguous since the transducer measures the distance to the head regardless of what direction the head is. By knowing the distance from the head to transducer 520, the ambiguity is substantially reduced.

Optical transducers using CCD arrays are now becoming price competitive and, as mentioned above, will soon be the technology of choice for interior vehicle monitoring. A single CCD array of 160 by 160 pixels, for example, coupled with the appropriate trained pattern recognition software, can be used to form an image of the head of an occupant and accurately locate the head for the purposes of this invention.

A rear-of-head detector 534 is also illustrated in FIG. 5. This detector is used to determine the distance from the headrest to the rear most position of the occupant's head and to control the position of the headrest so that it is properly positioned behind the occupant's head to offer optimum support in the event of a rear impact. Although the headrest of most vehicles is adjustable, it is rare for an occupant to position it properly, if at all. Each year there are in excess of 400,000 whiplash injuries in vehicle impacts approximately 90,000 of which are from rear impacts (source: National Highway Traffic Safety Administration, (NHTSA)). A properly positioned headrest could substantially reduce the frequency of such injuries which can be accomplished by the head detector of this invention. The head detector 534 is shown connected schematically to the headrest control mechanism and circuitry 540. This mechanism is capable of moving the headrest up and down and, in some cases, rotating it fore and aft. An occupant position sensor for side impacts used with a door mounted airbag system is illustrated at 530 in FIG. 5.

Seatbelts are most effective when the upper attachment point to the vehicle is positioned vertically close to the shoulder of the occupant being restrained. If the attachment point is too low, the occupant experiences discomfort from the rubbing of the belt on his or her shoulder. If it is too high the occupant may experience discomfort due to the rubbing of the belt against his or her neck and the occupant will move forward by a greater amount during a crash which may result in his or her head striking the steering wheel. For these reasons, it is desirable to have the upper seatbelt attachment point located slightly above the occupant's shoulder. To accomplish this for various sized occupants, the location of the occupant's shoulder must be known which can be accomplished by the vehicle interior monitoring system described herein.

Figure 6:
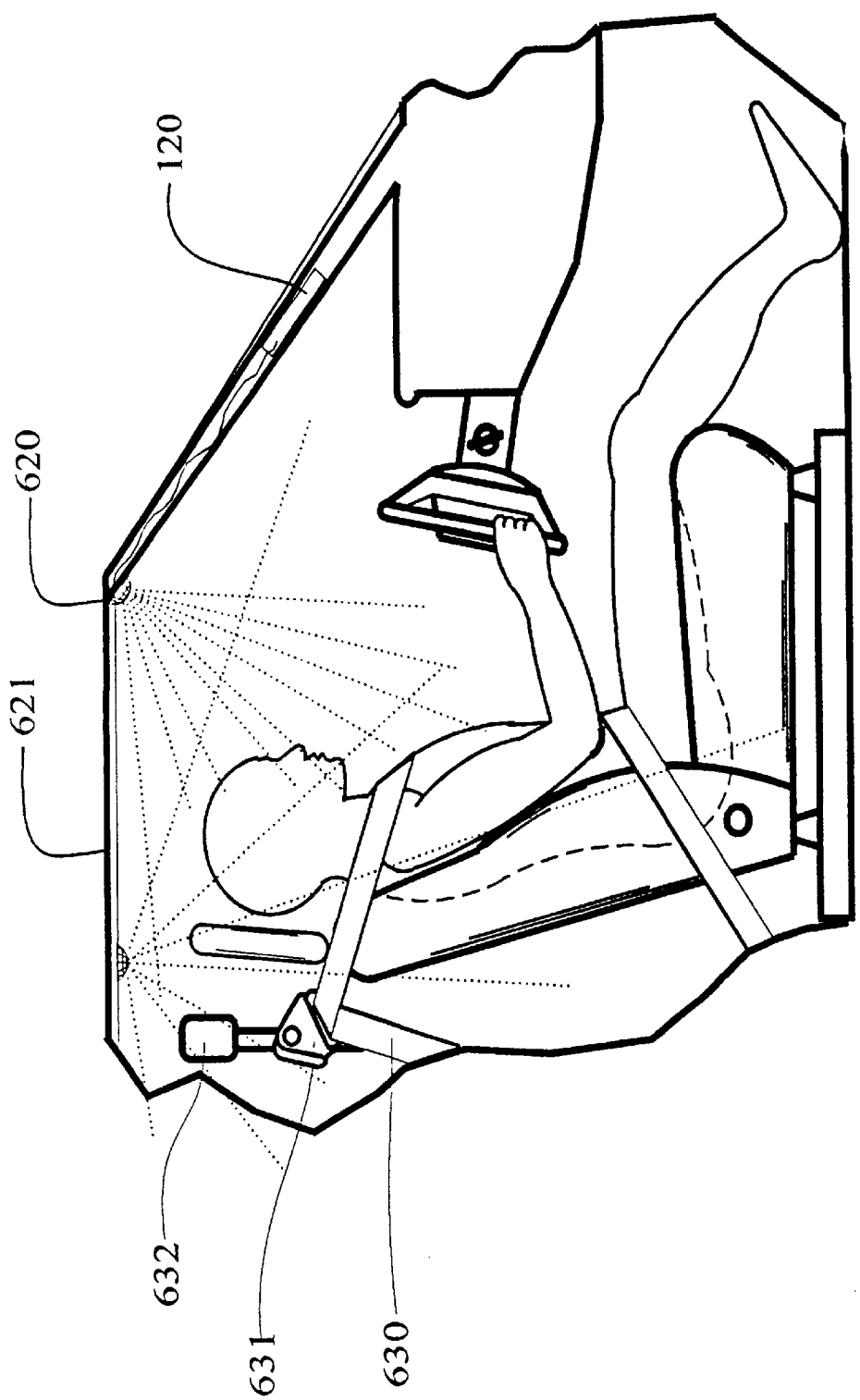
FIG. 6 is a side plan view of the interior of an automobile, with portions cut away and removed, with two occupant height measuring sensors, one mounted into the headliner above the occupant's head and the other mounted onto the A-pillar and also showing a seatbelt associated with the seat where the seatbelt has an adjustable upper anchorage point which is automatically adjusted corresponding to the height of the occupant.

Such a system is illustrated in FIG. 6 which is a side planer view of a seatbelt anchorage adjustment system. In this system, an infrared transmitter and CCD array receiver 620 is positioned in a convenient location such as the headliner located above and to the outside of the occupant's shoulder. An appropriate pattern recognition system as described above is then used to determine the location and position of the shoulder. This information is fed to the seatbelt anchorage height adjustment system 632, shown schematically, which moves the attachment point 631 to the optimum vertical location for the proper placement of the seatbelt 630.

Figure 7:
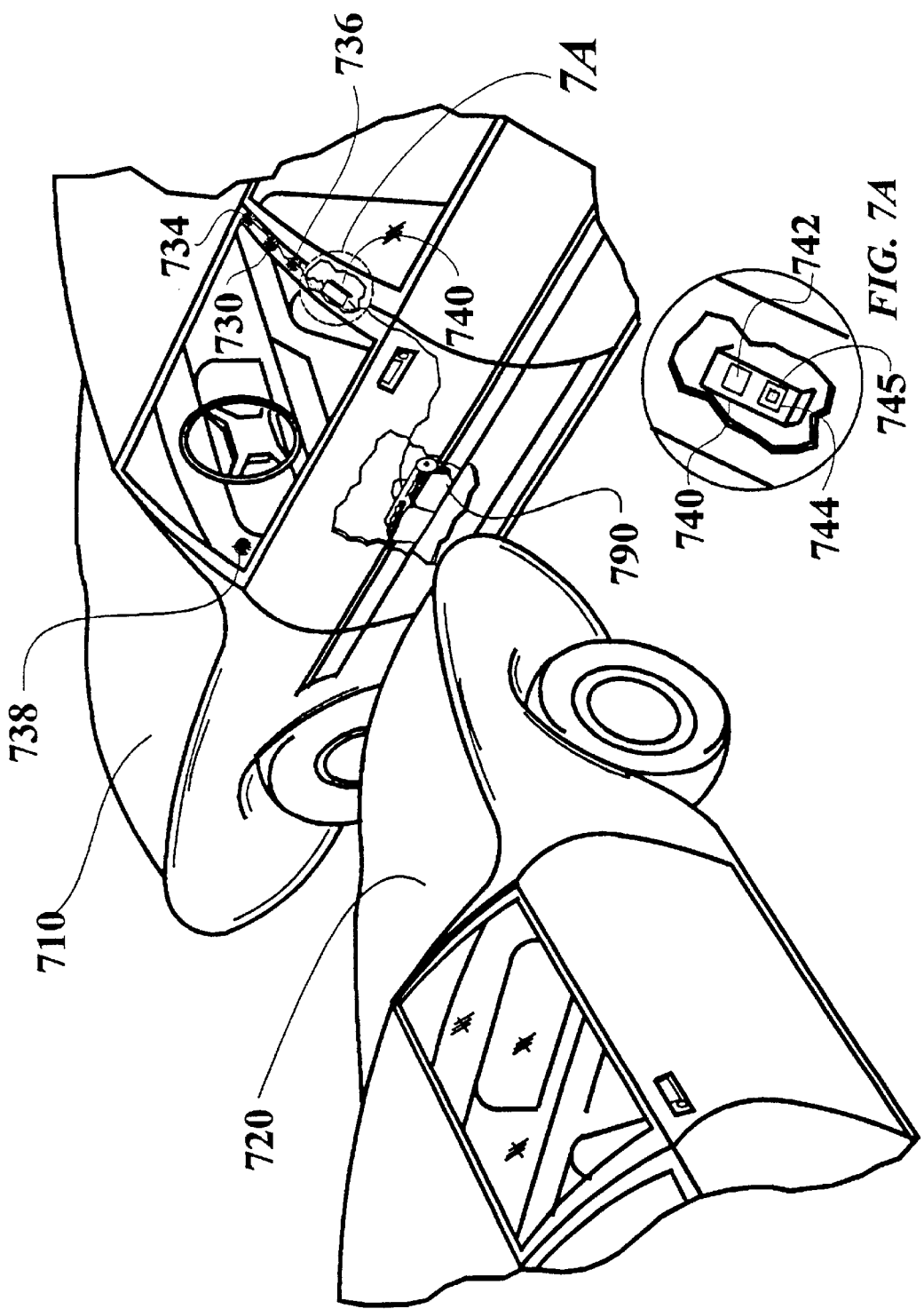
FIG. 7 is a perspective view of a vehicle about to impact the side of another vehicle showing the location of the various parts of the anticipatory sensor system of this invention.

FIG. 7 is an angular perspective overhead view of a vehicle 710 about to be impacted in the side by an approaching vehicle 720, where vehicle 710 is equipped with an anticipatory sensor system showing a transmitter 730 transmitting infrared waves toward vehicle 720. The transmitter 730 is connected to an electronic module 740. Module 740 contains circuitry 742 to drive transmitter 730 and circuitry 744 to process the returned signals from receivers 734 and 736 (FIG. 7A). Circuitry 744 contains a neural computer 745 which performs the pattern recognition determination based on signals from receivers 734 and 736. Receivers 734 and 736 are mounted onto the B-Pillar of the vehicle and are covered with a protective transparent cover. An alternate mounting location is shown as 738 which is in the door window trim panel where the rear view mirror (not shown) is frequently attached. One additional advantage of this system is the ability of infrared to penetrate fog and snow which makes this technology particularly applicable for anticipatory sensing applications.

The same system can also be used for the detection of objects in the blind spot of the vehicle and the image displayed for the operator to see, or a warning system activated, if the operator attempts to change lanes, for example. In this case, the mounting location must be chosen to provide a good view along the side of the vehicle in order to pickup vehicles which are about to pass vehicle 710. Each of the locations 734, 736 and 730 provide sufficient field of view for this application although the space immediately adjacent to the vehicle could be missed. Alternate locations include mounting onto the outside rear view mirror or the addition of a unit in the rear window or C-Pillar. The mirror location, however, does leave the device vulnerable to being covered with ice, snow and dirt.

In both cases of the anticipatory sensor and blind spot detector, the infrared transmitter and CCD array system provides mainly image information to permit recognition of the object in the vicinity of vehicle 710. To complete the process, distance information is also require as well as velocity information, which can in general be obtained by differentiating the position data. This can be accomplished by any one of the several methods discussed above as well as with a radar system. Radar systems, which would not be acceptable for use in the interior of the vehicle, are now commonly used in sensing applications exterior to the vehicle, police radar being one well-known example. Miniature radar systems are now available which are inexpensive and fit within the available space. Another advantage of radar in this application is that it is easy to get a transmitter with a desirable divergence angle so that the device does not have to be aimed. The best mode of practicing the invention for these cases is to use radar and the second best is the pulsed GaAs laser system, along with a CCD array, although the use of two CCD arrays or the acoustical systems are also good choices. Both the acoustical and the stenographic system using the two CCD arrays have the disadvantage of being slower than the GaAs device and the acoustical system in addition must be mounted outside of the vehicle where it may be affected by the accumulation of deposits onto the active surface.

In a preferred implementation, transmitter 730 is an infrared transmitter and receivers 734, 736 and 738 are CCD transducers which receive the reflected infrared waves from vehicle 720. In the implementation shown in FIG. 7, an exterior airbag 790 is shown which deploys in the event that a side impact is about to occur as described in copending application Ser. No. 08/247,760 cross referenced above.

Figure 8:
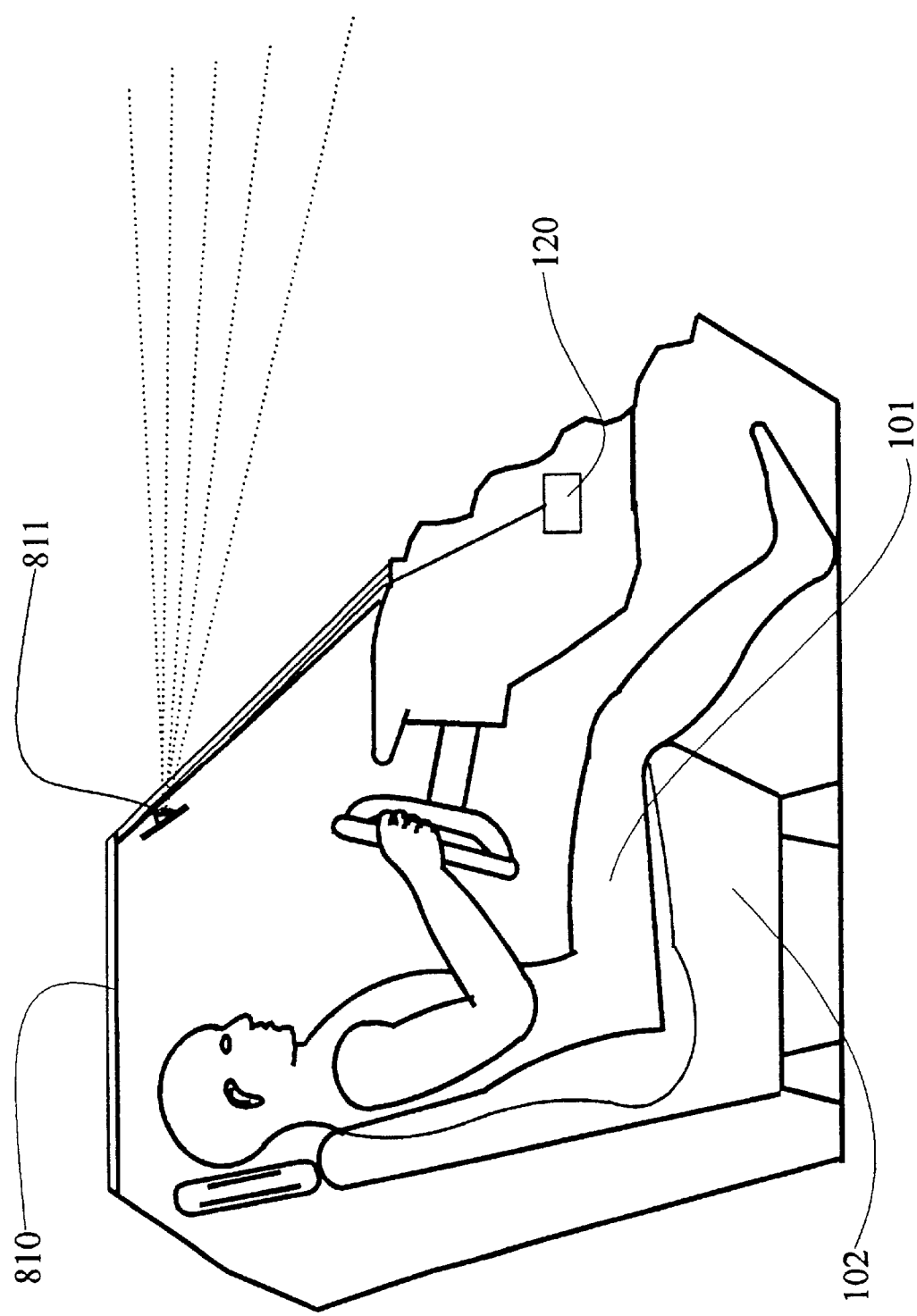
FIG. 8 is a side planar view, with certain portions removed or cut away, of a portion of the passenger compartment illustrating a sensor for sensing the headlights of an oncoming vehicle and/or the taillights of a leading vehicle used in conjunction with an automatic headlight dimming system.

FIG. 8 illustrates the exterior monitoring system for use in detecting the headlights of an oncoming vehicle or the taillights of a vehicle in front of vehicle 810. In this embodiment, the CCD array is designed to be sensitive to visible light and a separate source of illumination is not used. Once again, the key to this technology is the use of trained pattern recognition algorithms and particularly of the artificial neural network. Here as in the other cases above and in the co-pending patent applications referenced above, the pattern recognition system is trained to recognize the pattern of the headlights of an oncoming vehicle or the tail lights of a vehicle in front of vehicle 810 and to then dim the headlights when either of these conditions is sensed. It is also trained to not dim the lights from other reflections such as off of a signpost or the roadway. One problem is to differentiate taillights where dimming is desired from distant headlights where dimming is not desired. Three techniques are used: (i) measurement of the spacing of the light sources, (ii) determination of the location of the light sources relative to the vehicle, and (iii) use of a red filter where the brightness of the light source through the filter is compared with the brightness of the unfiltered light. In the case of the taillight, the brightness of the red filtered and unfiltered light is nearly the same while there is a significant difference for the headlight case. In this situation, either two CCD arrays are used, one with a filter, or a filter which can be removed either electrically, such as with a liquid crystal, or mechanically.

There has thus been shown and described a monitoring system for monitoring both the interior and the exterior of the vehicle using an optical system with one or more CCD arrays and other associated equipment which fulfills all the objects and advantages sought after. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

What is claimed is:

1. A system for controlling a vehicular system based on occupancy of an interior passenger compartment of a vehicle, comprising:

at least one transmitter for transmitting waves into a space in the passenger compartment in which an occupying item might be situated;

a plurality of receivers for receiving waves transmitted by each of said at least one transmitter and modified by passing through the space in the passenger compartment in which the occupying item might be situated, said receivers being spaced apart from one another; and output means coupled to said receivers for affecting another system in the vehicle based on the waves received by said receivers.

2. The system of claim 1, further comprising
processor means coupled to said receivers for generating a signal characteristic of the waves received by said receivers, and
identification means coupled to said processor means for identifying an occupying item which might be situated in the space in the passenger compartment based on the signal.

3. The system of claim 2, wherein said identification means comprise pattern recognition means for processing the signal to provide an identification of the occupying item based thereon, said pattern recognition means being structured and arranged to apply a pattern recognition algorithm generated from data of possible occupying items of the vehicle and patterns of received waves from the possible occupying items.

4. The system of claim 3, wherein said another system comprises an inflatable airbag, said pattern recognition means being structured and arranged to process the signal into a positional categorization of the signal characteristic of the position of the occupying item based on data corresponding to patterns of received waves associated with occupying items of the vehicle in different positions, said output means comprising means for modifying at least one of a decision to deploy said airbag, the time at which inflation of said airbag is initiated, the flow of inflator gas into said airbag and the flow of inflator gas out of said airbag in response to the position of the occupying item.

5. The system of claim 3, wherein said another system comprises an inflatable airbag, said pattern recognition means being structured and arranged to process the signal into a categorization of the signal characteristic of the presence of the occupying item based on data corresponding to patterns of received waves associated with the presence and absence of the occupying item, said output means comprising means for suppressing deployment of said airbag in response to either the absence of an occupying item, the presence of an out-of-position occupant or the presence of a rear-facing child seat.

6. The system of claim 3, wherein said pattern recognition means comprises a neural network.

7. The system of claim 1, wherein said at least one transmitter is structured and arranged to transmit waves in the electromagnetic range and at least one of said receivers comprise an array of elements.

8. The system of claim 1, wherein at least one of said receivers comprise means for converting light into electrical signals.

9. The system of claim 1, wherein at least one of said receivers is a CMOS dynamic pixel camera.

10. The system of claim 1, wherein at least one of said receivers is an active pixel camera.

11. The system of claim 1, wherein at least one of said receivers is a HDRC camera.

12. The system of claim 1, wherein said at least one transmitter and at least one of said receivers is arranged such that the waves transmitted by said at least one transmitter reflect off of the occupying item and are then received by said at least one receiver.

13. The system of claim 1, wherein said another system is an inflatable passive restraint apparatus and said output means comprises circuitry to control the deployment of said inflatable restraint apparatus.

14. The system of claim 1, further comprising
distance measuring means for measuring the distance between the occupying item and some other point in the passenger compartment;
said output means being coupled to said distance measuring means and being arranged to affect the another system based on the waves received by said receivers and the distance between the occupying item and said other point.

15. The system of claim 14, wherein said at least one transmitter is structured and arranged to transmit waves in the electromagnetic range and at least two of said receivers each comprising an array of elements and adapted to receive an image of the space in the passenger compartment in which the occupying item might be situated, said distance measurement means comprising means for analyzing images received by said arrays.

16. The system of claim 14, wherein said distance measuring means comprise triangulation means.

17. The system of claim 14, wherein said distance measuring means comprise a laser.

18. The system of claim 14, wherein said distance measuring means comprise structured light.

19. The system of claim 14, wherein said distance measuring means comprise an ultrasonic transmitter and receiver.

20. The system of claim 14, wherein said at least one transmitter comprises a phased array.

21. The system of claim 1, wherein said at least one transmitter is structured and arranged to transmit waves in the electromagnetic range and at least one of said receivers comprises an array of elements arranged to receive waves reflected off the vehicle windshield and without a direct line of sight between said array and the occupying item.

22. A method for controlling a vehicular system based on occupancy of an interior passenger compartment of a vehicle, comprising the steps of:
transmitting waves from at least one transmitter into a space in the passenger compartment in which an occupying item might be situated;
receiving waves transmitted by each of said at least one transmitter and modified by passing through the space in the passenger compartment in which the occupying item might be situated at a plurality of receivers spaced apart from one another; and
affecting another system in the vehicle based on the received waves transmitted by said at least one transmitter and modified by passing through the space in the passenger compartment in which the occupying item might be situated.

23. The method of claim 22, wherein the transmitted waves are electromagnetic waves.

24. The method of claim 22, wherein at least one of the receivers is an array of elements.

25. The method of claim 22, further comprising the steps of:
processing the received waves to generate a signal based thereon, and
processing the signal to provide an identification of the occupying item.

26. The method of claim 25, wherein said processing step comprising the steps of generating a pattern recognition algorithm from data of possible occupying items and patterns of received waves from the possible occupying items, storing the algorithm within a pattern recognition system and applying the pattern recognition algorithm using the signal as input to obtain the identification of the occupying item, the another system in the vehicle being affected in response to the identification of the occupying item.

27. The method of claim 22, further comprising the step of:

measuring the distance between the occupying item and another point in the passenger compartment, the another system being affected based on the received waves and the measured distance between the occupying item and the other point in the passenger compartment.

28. The method of claim 22, wherein at least one of the receivers is a CMOS dynamic pixel camera.

29. The method of claim 22, wherein at least one of the receivers is an active pixel camera.

30. The method of claim 22, wherein at least one of the receivers is a HDRC camera.

31. A system for controlling a vehicular system based on occupancy of an interior passenger compartment of a vehicle, comprising:

transmitter means for transmitting waves into a space in the passenger compartment in which an occupying item might be situated;

receiver means for receiving waves transmitted by said transmitter means and modified by passing through the space in the passenger compartment in which the occupying item might be situated;

processor means coupled to said receiver means for generating a signal characteristic of the waves received by said receiver means;

identification means coupled to said processor means for identifying an occupying item which might be situated in the space in the passenger compartment based on the signal; and output means coupled to said identification means for affecting another system in the vehicle based on the identification of the occupying item.

32. The system of claim 31, wherein said identification means comprise pattern recognition means for processing the signal to provide an identification of the occupying item based thereon, said pattern recognition means being structured and arranged to apply a pattern recognition algorithm generated from data of possible occupying items of the vehicle and patterns of received waves from the possible occupying items.

33. The system of claim 32, wherein said another system comprises an inflatable airbag, said pattern recognition means being structured and arranged to process the signal into a positional categorization of the signal characteristic of the position of the occupying item based on data corresponding to patterns of received waves associated with occupying items of the vehicle in different positions, said output means comprising means for modifying at least one of a decision to deploy said airbag, the time at which inflation of said airbag is initiated, the flow of inflator gas into said airbag and the flow of inflator gas out of said airbag in response to the position of the occupying item.

34. The system of claim 32, wherein said another system comprises an inflatable airbag, said pattern recognition means being structured and arranged to process the signal into a categorization of the signal characteristic of the presence of the occupying item based on data corresponding to patterns of received waves associated with the presence and absence of the occupying item, said output means comprising means for suppressing deployment of said airbag in response to either the absence of an occupying item, the presence of an out-of-position occupant or the presence of a rear-facing child seat.

35. The system of claim 32, wherein said pattern recognition means comprises a neural network.

36. A method for controlling a vehicular system based on occupancy of an interior passenger compartment of a vehicle, comprising the steps of:

transmitting waves from at least one transmitter into a space in the passenger compartment in which an occupying item might be situated;

receiving waves transmitted by said at least one transmitter and modified by passing through the space in the passenger compartment in which the occupying item might be situated;

processing the received waves to generate a signal based thereon;

processing the signal to provide an identification of the occupying item; and affecting another system in the vehicle based on the identification of the occupying item.

37. The method of claim 36, wherein said processing step comprising the steps of generating a pattern recognition algorithm from data of possible occupying items and patterns of received waves from the possible occupying items, storing the algorithm within a pattern recognition system and applying the pattern recognition algorithm using the signal as input to obtain the identification of the occupying item.

38. The system of claim 1, further comprising a processor embodying a trained pattern recognition algorithm created from a plurality of data sets, each of said data sets representing a different occupying item of the seat and being formed from data from said receivers while the occupying item is in the seat, said trained pattern recognition algorithm producing the identification of the current occupying item in the seat upon inputting a data set representing the current occupying item in the seat and being formed from data from said receivers, said processor forwarding the identification of the current occupying item to said output means.

39. The method of claim 22, further comprising the steps of:

creating a trained pattern recognition algorithm from a plurality of data sets, each of the data sets representing a different occupying item of the seat and being formed from data from the receivers while the occupying item is in the seat;

applying the trained pattern recognition algorithm to produce the identification of the current occupying item in the seat upon inputting a data set representing the current occupying item in the seat and being formed from data from the receivers; and forwarding the identification of the current occupying item to the another system.

* * * * *